(12) United States Patent
Emoto et al.

(10) Patent No.: US 8,006,964 B2
(45) Date of Patent: Aug. 30, 2011

(54) VIBRATION ISOLATION DEVICE

(75) Inventors: Shigeo Emoto, Tokyo (JP); Takahiro Tsuchiya, Kanagawa-ken (JP)

(73) Assignee: Unirock Co., Ltd., Tokyo (JP)

( * ) Notice: Subject to any disclaimer, the term of this patent is extended or adjusted under 35 U.S.C. 154(b) by 1301 days.

(21) Appl. No.: 11/470,436

(22) Filed: Sep. 6, 2006

(65) Prior Publication Data

US 2007/0052143 A1 Mar. 8, 2007

(30) Foreign Application Priority Data

Sep. 7, 2005 (JP) ................................. 2005-259582
Jul. 14, 2006 (JP) ................................. 2006-193484

(51) Int. Cl.
*F16F 5/00* (2006.01)
*F16F 1/00* (2006.01)

(52) U.S. Cl. ........... 267/140.11; 267/140.13; 267/140.5; 267/150

(58) Field of Classification Search ............. 267/140.11, 267/140.13, 140, 5, 150; 248/560, 562, 564, 248/566, 565, 586; 52/167.7, 167.8
See application file for complete search history.

(56) References Cited

U.S. PATENT DOCUMENTS 2,562,195 A * 7/1951 Lee ......................... 267/140.13
2,631,841 A * 3/1953 Tillou et al. ................... 267/134
4,565,039 A * 1/1986 Oguro et al. ................. 52/167.4

FOREIGN PATENT DOCUMENTS

JP 2000161433 6/2000
JP 2002147528 5/2002

* cited by examiner

*Primary Examiner* — Bradley T King
*Assistant Examiner* — Mahbubur Rashid
(74) *Attorney, Agent, or Firm* — Kenealy Vaidya LLP

(57) ABSTRACT

A vibration isolation device can more effectively restrain vibration in the horizontal direction rather than in the vertical direction with a simple construction. In addition, vibration of a frequency of a machine mode caused by an internal structure of the vibration isolation device is reduced with a simple construction.

12 Claims, 19 Drawing Sheets

(A)

(B)

(A)

(B)

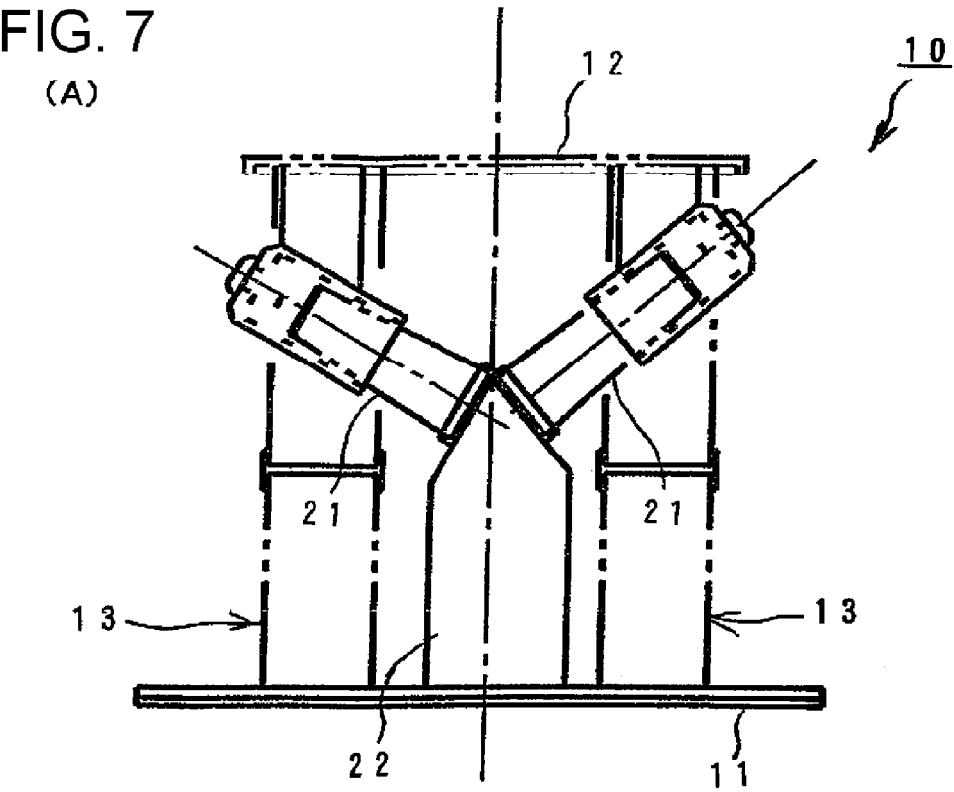
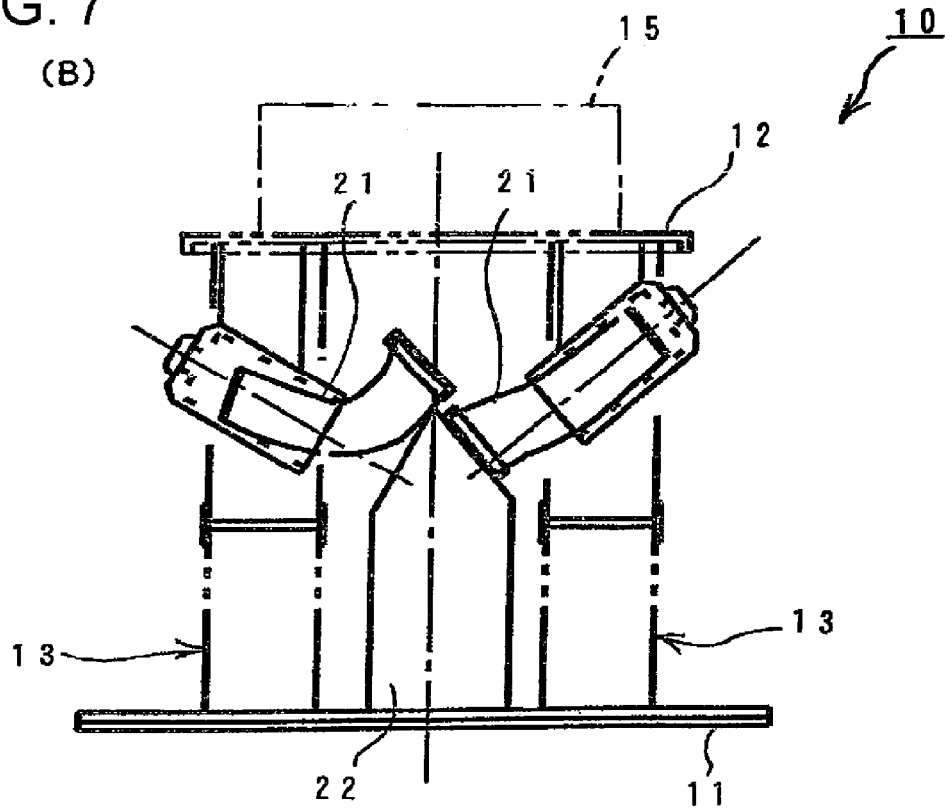

(A)

(C)

(B)

(D)

| TEMPERATURE 23°C<br>EXCITATION FREQUENCY (Hz) | STORAGE LONGITUDINAL ELASTIC MODULUS ($kg/mm^2$) X | LOSS LONGITUDINAL ELASTIC MODULUS ($kg/mm^2$) Y |
|---|---|---|
| 3 | 3.1 | 8.8 |
| 5 | 4.4 | 7.5 |
| 10 | 12.0 | 13.7 |
| 30 | 36.8 | 30.2 |
| 50 | 61.5 | 46.8 |
| 100 | 116.8 | 83.6 |
| 150 | 162.8 | 114.3 |
| 200 | 205.7 | 138.8 |

FIG. 14

VIBRATION ISOLATION DEVICE

This application claims the priority benefit under 35 U.S.C. §119 of Japanese Patent Application No. 2005-259582 filed on Sep. 7, 2005 and Japanese Patent Application No. 2006-193484 filed on Jul. 14, 2006, which are both hereby incorporated in their entirety by reference.

BACKGROUND OF THE INVENTION

1. Field of the Invention

The present invention relates to a vibration isolation device which supports a structure such as a scanning electron microscope or the like, for example, and restrains its vibration.

2. Background

This type of conventional vibration isolation device is constituted so that an upper plate arranged horizontally is supported by coil springs above a lower plate fixedly arranged horizontally with a predetermined interval and a natural frequency is lowered by a viscoelastic body connecting the lower plate and the upper plate to each other, for example. And the coil springs improve vibration resistant effect in the vertical direction by increasing its deflection amount.

This device uses a vibration isolation theory that in case of vibration isolation of a structure, for example, a natural frequency (resonance frequency) of relating to vibration isolation depends on a deflection amount when supporting a structure, and that the larger the deflection amount is, the lower the natural frequency becomes, which improves the vibration resistant effect.

On the other hand, the Patent Document 1 discloses a vibration resistant device in which a lower plate is suspended by three or more links with respect to a fixed mount and these links are made to act as pendulums so as to lower a natural frequency in the horizontal direction and to restrain vibration in the horizontal direction.

Also, the Patent Document 2 discloses a vibration resistant device which adjusts a resonance frequency set in combination with a viscoelastic body while a natural frequency of a coil spring is kept lowered by pressing down a top part of the viscoelastic body so as to change its compression amount.

[Patent Document 1] Japanese Patent Application Laid-Open No. 2000-161433

[Patent Document 2] Japanese Patent No. 3543758

However, the above-mentioned vibration isolation device and the vibration resistant device according to the Patent Documents 1 and 2 have the following problems.

That is, the above vibration isolation device is constructed to restrain vibration in the vertical direction and not constructed to restrain vibration in the horizontal direction. Therefore, it has been difficult to restrain the vibration in the horizontal direction.

On the other hand, in the vibration resistant device according to the Patent Document 1, since the links are used to restrain vibration in the horizontal direction, the structure becomes complicated.

Also, in the vibration resistant device according to the Patent Document 2, since the resonance frequency is adjusted at an installation site of the vibration resistant device, an installation work at the installation site becomes complicated.

The present invention was made in view of the above point one aspect is to provide a vibration isolation device which can effectively restrain vibration in the horizontal direction rather than in the vertical direction with a simple construction.

Other type of vibration isolation device has been required to put more emphasis on vibration isolation in the horizontal direction rather than in the vertical direction and is constructed as disclosed in Japanese Patent Laid-Open No. 2000-161433, for example, and shown in FIG. 17.

That is, in FIG. 17, a vibration isolation device 1 comprises a lower plate 2 fixedly arranged horizontally and an upper plate 3 arranged horizontally above it with a predetermined interval supported by 4 to 8 coil springs (lower springs 5 and upper springs 6) arranged in point symmetry through an intermediate plate 4 in the two-stage construction, and a viscoelastic body 7 connecting the lower plate and upper plate to each other in the vicinity of the center, by which a natural frequency is lowered.

Each of the lower springs 5 is stuck to the lower plate 2 at the lower end, while the upper end is stuck to the intermediate plate 4.

Also, each of the upper springs 6 is similarly stuck to the intermediate plate 4 at the lower end and the upper end is stuck to the upper plate 3.

Further, each of the upper springs 6 is arranged at a position with its elastic center aligned with the elastic center of the corresponding lower spring 5, respectively, so as to construct the two-stage coil spring construction.

Here, by selecting each of the coil springs 5, 6 with the free length longer than the outer diameter, a deflection amount in the vertical direction is selected smaller.

Moreover, the viscoelastic body 7 complements the small vibration damping performance of respective coil springs 5, 6 so that a sufficient vibration damping performance is kept and a natural frequency in the horizontal direction is a lower frequency.

When the vibration of an electronic microscope is to be isolated using so constructed vibration isolation device 1, the vibration isolation device 1 is arranged at four locations on a mount 8 made of steel members, and a lens barrel portion 9 which is particularly subjected to vibration in the electronic microscope is loaded on these vibration isolation devices 1 as shown in FIG. 18. By this, oscillation of the lens barrel portion 9 has a low frequency due to vibration isolation action of the respective vibration isolation devices 1, and vibration with a high frequency entering from a floor G to the mount can be reduced. [Patent Document 1] Japanese Patent Application Laid-Open No. 2000-161433

Here, when a dummy load is loaded instead of the above-mentioned lens barrel portion 9 on the mount 8 shown in FIG. 18 using the above-mentioned vibration isolation device 1 and the vibration in the floor G and the dummy load portion are measured by a vibration sensor, it is known as shown in FIG. 19 that a resonance A by the mount 8 and the internal structure of the vibration isolation device 1, a resonance B by the dummy load and a natural vibration C by the vibration isolation device 1 are generated. These vibrations are divided into the natural vibration C (approximately 6 Hz) by the vibration isolation device 1, the resonance B by a machine mode of the dummy load itself and the resonance A considered to be caused by the mount 8 and the internal structure of the vibration isolation device 1.

By the way, according to a theoretical vibration isolation effect, the vibration with a frequency higher than an amplification area (around 6 Hz) in the vicinity of the natural frequency of the vibration isolation device 1 should be able to be reduced. However, the resonances A, B by the machine mode caused by the dummy load, the mount 8, and the internal structure of the vibration isolation device 1 should have been able to be vibration-isolated but actually, such a phenomenon occurs that these frequencies can not be vibration-isolated.

The present invention was made in view of the above and other points and considerations and can provide a vibration isolation device in which vibration of a frequency of a machine mode caused by the internal structure of the vibration isolation device is reduced with a simple construction.

SUMMARY OF THE INVENTION

A vibration isolation device can include a lower plate fixedly arranged horizontally, an upper plate arranged horizontally above this lower plate with a predetermined interval and supporting a supported object such as a structure, a viscoelastic body connecting the lower plate and the upper plate to each other, and compression coil springs arranged between the lower plate and the upper plate in the vertical direction, the coil springs being arranged at positions of a plurality of pairs with an equiangular interval in the point symmetry around a center line, extending vertically from the lower plate to the upper plate, and comprised by a coil spring with a free length longer than the respective outer diameter, and the viscoelastic body being arranged axisymmetrically with respect to the center line of the upper plate and the lower plate and inclined with respect to this centerline, wherein the viscoelastic body is arranged in a hollow cylinder portion extending in its longitudinal direction and having its upper end fixed to the lower plate or the upper plate and the lower end arranged opposite to an inclined face of a receiving mount on the upper plate or the lower plate side and compressed/adjusted in the longitudinal axis direction by an adjusting screw capable of insertion to/removal from the hollow cylinder portion, and a receiving plate mounted to an end face of the lower end is pulled by a tension spring and housed into the hollow cylinder portion.

In the vibration isolation device according to the present invention, it is preferable that the receiving plate mounted at the lower end of the viscoelastic body is opposed to the inclined face of the opposing receiving mount when a supported object is loaded on the upper plate.

In the vibration isolation device according to the present invention, it is preferable that the receiving plate mounted at the lower end of the viscoelastic body is adjusted by the adjusting screw in the state where the supported object is loaded on the upper plate and brought into contact with the inclined face of the opposing receiving mount.

In the vibration isolation device according to the present invention, it is preferable that the receiving plate mounted at the lower end of the viscoelastic body is separated from the inclined face of the opposing receiving mount in the state where the supported object is not loaded on the upper plate.

In the vibration isolation device according to the present invention, it is preferable that a plate is provided perpendicularly to the inclined face above the receiving mount opposed to the receiving plate mounted at the end face of the lower end of the viscoelastic body.

In the vibration isolation device according to the present invention, it is preferable that the receiving plate mounted on the end face of the lower end of the viscoelastic body is pivotally supported by a hinge on the upper part of the inclined face of the opposing receiving mount.

In the vibration isolation device according to the present invention, it is preferable that the receiving plate mounted at the lower end of the viscoelastic body is brought into contact with the inclined face of the opposing receiving mount when the supported object is loaded on the upper plate.

In the vibration isolation device according to the present invention, it is preferable that the receiving plate mounted at the lower end of the viscoelastic body is rotationally moved around the hinge in the state where the supported object is not loaded on the upper plate and the lower side is separated from the inclined face of the opposing receiving mount.

In the vibration isolation device according to the present invention, it is preferable that the hollow cylinder portion is provided with a notch portion to prevent contact of the viscoelastic body when the receiving plate is rotationally moved around the hinge and the lower part is floated.

According to the above construction, since the respective coil springs extending in the vertical direction between the lower plate and the upper plate are arranged in a plurality of pairs around the center line and have free lengths longer than the outer diameter, the entire deflection amount in the vertical direction is reduced. By this, the natural frequency of a rotation below the center of gravity of the supported object (primary rotation) becomes smaller than the natural frequency of the rotation above the center of gravity (secondary rotation), and in the oscillation in the horizontal direction of the upper plate and the supported object, the oscillation below the center of gravity becomes a low frequency and the deflection amount in the horizontal direction rather than the vertical direction becomes relatively large. Thus, the natural frequency in the horizontal direction is lowered, which improves vibration resistant effect in the horizontal direction.

Also, since the viscoelastic body is arranged axisymmetrically with respect to the center line of the upper plate and the lower plate with inclination with respect to the center line, vibration in the vertical direction can be absorbed by the pair of viscoelastic bodies located on both sides of the center line, and vibration in the horizontal direction can be also absorbed by the inclined arrangement of the viscoelastic bodies. Moreover, each of the viscoelastic bodies can be inserted to/removed from the hollow cylinder portion by the adjusting screw, and vibration absorbing characteristics can be adjusted.

In this case, since the receiving plate mounted on the end face of the lower end of each of the viscoelastic bodies is pulled by the tension spring and housed into the hollow cylinder portion, the lower end of each of the viscoelastic bodies is separated from the inclined face of the opposing receiving mount both before and after the supported object is loaded on the upper plate. Therefore, even if loading of the supported object is repeated, there would be no instance such that the lower end of each of the viscoelastic bodies slides over the opposing inclined face of the receiving mount and displaced, or the vicinity of the lower end of the viscoelastic body is destroyed when a stress is applied to the vicinity of the lower end of the viscoelastic body due to adhesion thereof before the supported object is loaded.

When the receiving plate mounted at the lower end of the viscoelastic body is opposed to the inclined face of the opposing receiving mount at loading of the supported object on the upper plate, the lower end of the viscoelastic body is brought into contact with the approximate vicinity of the center without displacement in the vertical direction from the inclined face of the opposing receiving mount by adjusting the adjusting screw in the opposed state and acts as the viscoelastic body. Particularly, if the lower end of the viscoelastic body is separated from the inclined face of the opposing receiving mount in the opposed state, since the lower end of the viscoelastic body is separated from the inclined face of the opposing receiving mount throughout before and after loading of the supported object onto the upper plate, the lower end of the viscoelastic body is not made to slide over the inclined face of the opposing receiving mount by loading of the supported object. Thus, no unnecessary stress is applied to the viscoelastic body and destruction of the viscoelastic body can be prevented.

When the receiving plate mounted at the lower end of the viscoelastic body is adjusted by the adjusting screw while the supported object is loaded on the upper plate and brought into contact with the inclined face of the opposing receiving mount, the lower end of the respective viscoelastic bodies is adjusted by the adjusting screw while being opposed to the inclined face of the opposing receiving mount by loading of the supported object and extended in the longitudinal direction to be brought into contact with the inclined face of the opposing receiving mount. Therefore, the respective viscoelastic bodies are extended straight in the longitudinal direction and brought into contact with the vicinity of the approximate center without vertical displacement of the lower end of the viscoelastic body with respect to the inclined face of the receiving mount.

When the receiving plate mounted at the lower end of the viscoelastic body is separated from the inclined face of the opposing receiving mount while the supported object is not loaded on the upper plate, no unnecessary stress is applied to the lower end of the viscoelastic body as in the case where the lower end of the viscoelastic body is stuck to the inclined face of the opposing receiving mount, and destruction of the viscoelastic body can be prevented.

If the receiving plate mounted on the end face of the lower end of the viscoelastic body is pivotally supported by the hinge on the upper part of the inclined face of the opposing receiving mount, when the lower end of the respective viscoelastic bodies is separated from the inclined face of the opposing receiving mount before/after loading of the supported object, the receiving plate is rotationally moved around the hinge and only the lower part of the receiving plate is separated from the inclined face. Also, when the lower end of the respective viscoelastic bodies having been adjusted by the adjusting screw from this state is brought into contact with the inclined face of the opposing receiving mount, the lower end does not slide over the inclined face and no unnecessary application of stress or deformation occurs in the vicinity of the lower end of the respective viscoelastic bodies and destruction of the viscoelastic body can be prevented.

When the receiving plate mounted at the lower end of the viscoelastic body is brought into contact with the inclined face of the opposing receiving mount at loading of the supported object on the upper plate, the lower end of the respective elastic bodies is brought into contact with a predetermined position in the vicinity of the approximate center determined by rotational movement of the receiving plate with respect to the inclined face of the opposing receiving mount and acts as the viscoelastic body.

When the receiving plate mounted at the lower end of the viscoelastic body is rotationally moved around the hinge and the lower part is separated from the inclined face of the opposing receiving mount in the state where the supported object is not loaded on the upper plate, the lower end of the respective viscoelastic bodies is separated without sliding on the inclined face of the opposing receiving mount.

If the hollow cylinder portion is provided with the notch portion to prevent contact of the viscoelastic body when the receiving plate is rotationally moved around the hinge and the lower part is floated, when the viscoelastic body is bent and deformed by rotational movement of the receiving plate, the viscoelastic body can avoid being pressed by the lower edge of the hollow cylinder portion and closely bent through escape into the notch portion. Therefore, stress applied on the viscoelastic body can be reduced and destruction of the viscoelastic body can be further prevented.

In this way, according to the vibration isolation device of the present invention, vibration in the horizontal direction rather than the vertical direction can be more effectively restrained with a simple construction and destruction of the viscoelastic body due to repetition of loading of the supported object can be also effectively prevented.

Another aspect of the present invention is embodied in a vibration isolation device comprising a lower plate fixedly arranged horizontally, an upper plate arranged horizontally above the lower plate with a predetermined interval and supporting a supported object such as a structure, an intermediate plate arranged between the lower plate and the upper plate horizontally and provided with a through hole at the center, a single first viscoelastic body passing through the through hole of the intermediate plate and connecting the lower plate and the upper plate to each other, at least three or more first compression coil springs arranged around the viscoelastic body so that they extend in the vertical direction between the lower plate and the intermediate plate, and at least three or more second compression coil springs extending in the vertical direction at the same positions as the first compression coil springs with respect to the horizontal direction between the intermediate plate and the upper plate, the corresponding first and second compression coil springs being arranged in point symmetry or with an equiangular interval around a center line of the first viscoelastic body, respectively, wherein a plurality of second viscoelastic bodies is arranged between the lower plate and the intermediate plate at positions not interfering with the first compression coil springs with respect to the horizontal direction and extending in the vertical direction so as to connect the lower plate and the intermediate plate to each other.

In the vibration isolation device according to the present invention, the above second viscoelastic bodies are arranged in an area between the first compression coil springs.

In the vibration isolation device according to the present invention, the above second viscoelastic bodies are arranged within at least a part of the first compression coil springs.

In the vibration isolation device according to the present invention, the above second viscoelastic bodies are formed from a material in a glass transition zone under an operating temperature condition.

According to the above construction, the upper plate is supported by the first and second compression coil springs as the two-stage construction of coil springs with respect to the lower plate, and oscillation at the natural frequency is damped by the first viscoelastic body. That is, the natural frequency of the entire vibration isolation device is not more than 10 Hz both in the vertical direction and the horizontal direction, and the oscillation at this natural frequency is damped by the first viscoelastic body set corresponding to a spring constant of the coil springs in the two-stage construction.

Moreover, the intermediate plate located between the lower plate and upper plate is supported by the first and second compression coil springs at the upper and lower parts, respectively, and since these compression coil springs have relatively small damping, a resonance phenomenon of the intermediate plate is easily generated as a machine mode. However, since the second viscoelastic bodies are provided between the lower plate and intermediate plate, the intermediate plate is supported by the lower plate and the resonance phenomenon of the intermediate plate can be restrained by the second viscoelastic bodies. Therefore, the vibration isolation effect relating to vibration by the machine mode can be improved. Incidentally, if the second viscoelastic bodies are also provided between the intermediate plate and upper plate, the natural frequency of the entire vibration isolation device is increased and the basic vibration isolation effect is lost.

When the above second viscoelastic bodies are arranged in an area between the first compression coil springs, the second viscoelastic bodies can be arranged without affecting arrangement of the first compression coil springs.

When the second viscoelastic bodies are arranged within at least a part of the first compression coil springs, the second viscoelastic bodies can be arranged without affecting arrangement of the first compression coil springs and also, even when a space can not be ensured around the first compression coil springs, the second viscoelastic bodies can be easily arranged.

When the above second viscoelastic bodies are formed from a material in a glass transition zone under an operating temperature condition, the higher the frequency is, the higher the longitudinal elastic modulus becomes, and they are relatively flexible in accordance with the first and second compression coil springs in a lower frequency range and becomes relatively hard in a high frequency range. By this, vibration of a relatively high frequency by the machine mode can be effectively reduced.

In this way, according to the vibration isolation device by the present invention, the vibration of the frequency of the machine mode caused by the internal structure of the vibration isolation device can be effectively reduced.

BRIEF DESCRIPTION OF THE DRAWINGS

FIGS. 7A and 7B are schematic side views showing states (A) before the device is loaded and (B) after the device is loaded when the lower ends of the viscoelastic bodies are not stuck but brought into contact with the inclined faces of the receiving mount in the vibration isolation device in FIG. 1, respectively;

FIG. 14 is a table showing a frequency characteristic of a material of a longitudinal elastic modulus of the second viscoelastic body in the vibration isolation device in FIG. 12;

DESCRIPTION OF EXEMPLARY EMBODIMENTS

Exemplary embodiments of the present invention will be described below in detail referring to FIGS. 1 to 12. Note that the embodiments described below are preferred embodiments of the present invention, and technically preferable various features are applied. However, the scope of the present invention is not limited to those modes.

Embodiment 1

Figure 1:
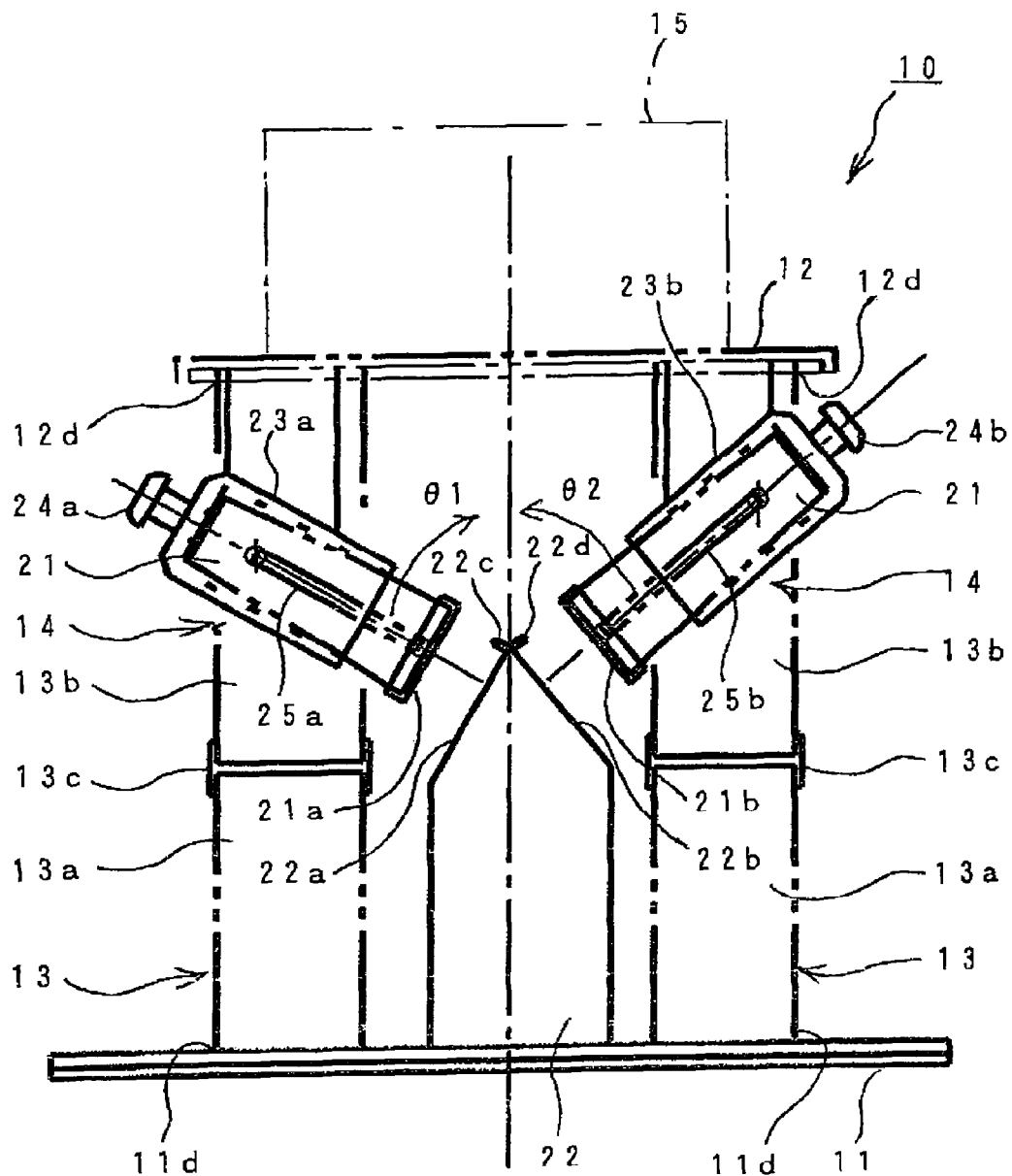
FIG. 1 is a schematic side view showing a construction of a first embodiment of the vibration isolation device according to the present invention.
Figure 2:
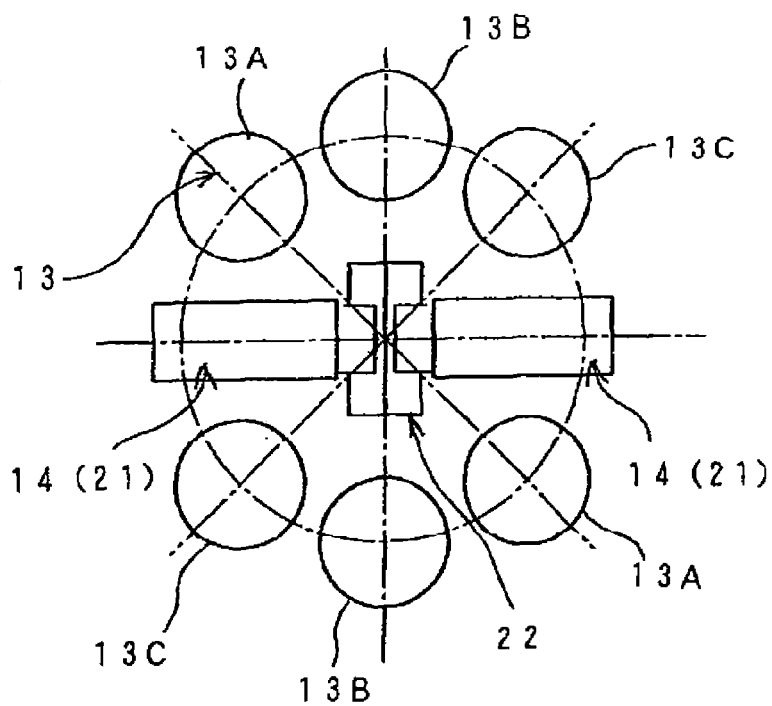
FIG. 2 is a schematic plan view showing an arrangement example of compression coil springs and viscoelastic bodies in the vibration isolation device in FIG. 1.
Figure 2:
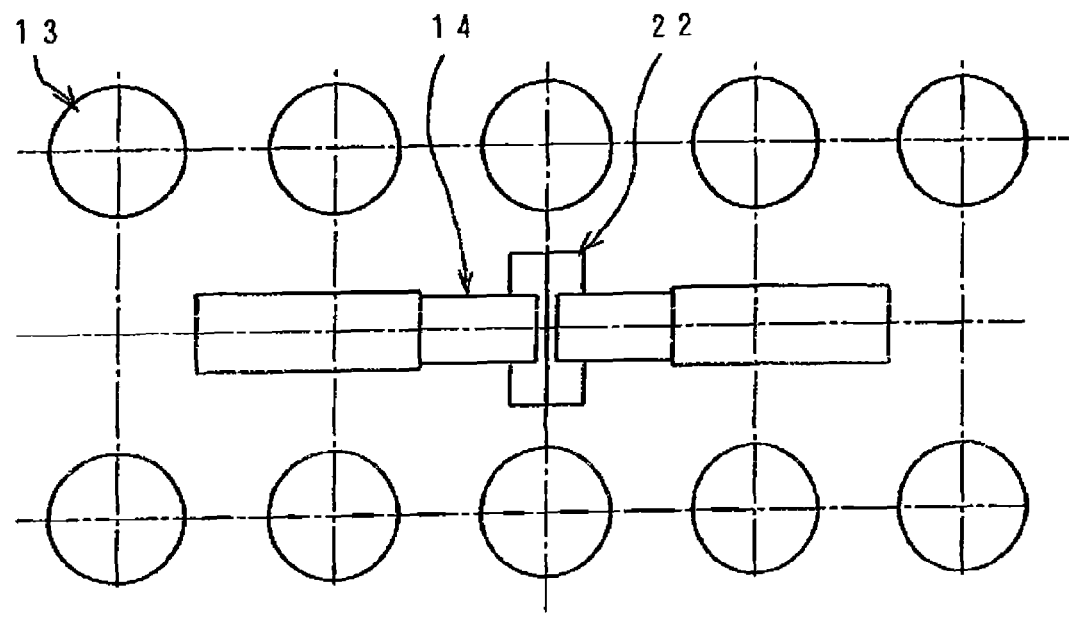

FIG. 1 shows a construction of a first embodiment of a vibration isolation device according to the present invention. In FIG. 1, a vibration isolation device 10 comprises a lower plate 11, an upper plate 12, a plurality of pairs of compression coil springs 13 arranged between the lower plate 11 and the upper plate 12, and viscoelastic bodies 14 arranged between the lower plate 11 and the upper plate 12.

The lower plate 11 is constructed by a flat plate, for example, fixedly arranged horizontally. The upper plate 12 is similarly constructed by a flat plate, for example, and arranged horizontally with a predetermined interval above the lower plate 11. Moreover, the upper plate 12 supports a supported object (electronic microscope, for example) 15 such as a structure loaded on its upper face.

The compression coil springs 13 are equiangularly arranged on a circumference with a predetermined radius with respect to the center line perpendicularly passing the lower plate 11 and the upper plate 12 so as to extend in the vertical direction in parallel with the center line, respectively, and as shown in FIG. 2A, for example, a single pair of compression coil springs 13 located diagonally opposite to each other of the respective coil springs 13 are omitted and viscoelastic bodies 14 are arranged instead.

Here, the respective compression coil springs 13 use springs with free length longer than the outer diameter of the respective springs, and the diagonally located compression coil springs have the same spring constant. That is, as shown in FIG. 2A, for example, one pair of compression coil springs 13A have a predetermined spring constant, another pair of compression coil springs 13B have a spring constant different from that and still another pair of compression coil springs 13C have the same spring constant as that of either of the pair of compression coil springs 13A and 13B or a spring constant different from those. Here, the respective compression coil springs 13 are selected so that a spring constant Kh in the horizontal direction is ⅕ to ¹⁄₂₅ of a spring constant Kz in the vertical direction.

Moreover, the above respective compression coil springs 13 are constructed in two stages. That is, each of the compression coil springs 13 is constructed from a lower spring 13a and an upper spring 13b, respectively, as shown in FIG. 1, and the lower spring 13a and the upper spring 13b are arranged so that they have the same spring ratio.

Here, the elastic center of the upper spring 13b in the two-stage construction is arranged coaxially with the elastic center of the lower spring 13b, and in the spring construction of each stage, a spring with a large spring constant is arranged on a spring with a large spring constant.

Further, in each of the compression coil springs 13, the lower end of the lower spring 13a is fixed into a spring receiving hole 11d on the upper face of the lower plate 11 by adhesion or the like, and the upper end is fixed to the lower face of an intermediate plate 13c by adhesion or the like, while the lower end of the upper spring 13b is fixed to the intermediate plate 13c by adhesion or the like and the upper end is fixed into a spring receiving hole 12d on the lower face of the upper plate 12 by adhesion or the like.

The above viscoelastic body 14 is comprised by a pair of viscoelastic bodies 21, and each of the viscoelastic bodies 21 is comprised by a material having viscoelasticity such as thermoplastic resin or thermosetting resin, for example, and formed in the tapered shape so as to become thinner upward in the figure. Each of the viscoelastic bodies 21 is arranged with inclination outward in opposite direction to each other by predetermined upward angles θ1, θ2, respectively. Incidentally, in this case, the above predetermined angles θ1, θ2 of each of the viscoelastic bodies 21 may be the same or different from each other.

In each of the viscoelastic bodies 21, its lower end is arranged opposite inclined faces 22a, 22b of a receiving mount 22 extending upward from the center of the lower plate 21, and the upper end is inserted into hollow cylinder portions 23a, 23b supported diagonally with respect to the lower face of the upper plate 22 so that they can be compressed in the longitudinal direction by adjusting screws 24a, 24b. Incidentally, in this case, the inclining areas of the inclined faces 22a, 22b of the receiving mount 22 may be different from each other. By this, by arranging each of the viscoelastic bodies 21 along the direction of a rotating motion by primary rotation and secondary rotation of the equipment 15, a larger damping amount can be obtained and resonance phenomenon can be restrained.

Here, the respective viscoelastic bodies 21 are arranged at spaces where omitted compression coil springs should have existed after a pair of diagonally located compression coil springs out of the annularly arranged four pairs of compression coil springs 13 were omitted as shown in FIG. 2A. Incidentally, the compression coil springs 23 may be arranged in two rows side by side, between which the respective viscoelastic bodies 21 are arranged as shown in FIG. 2B.

Figure 3:
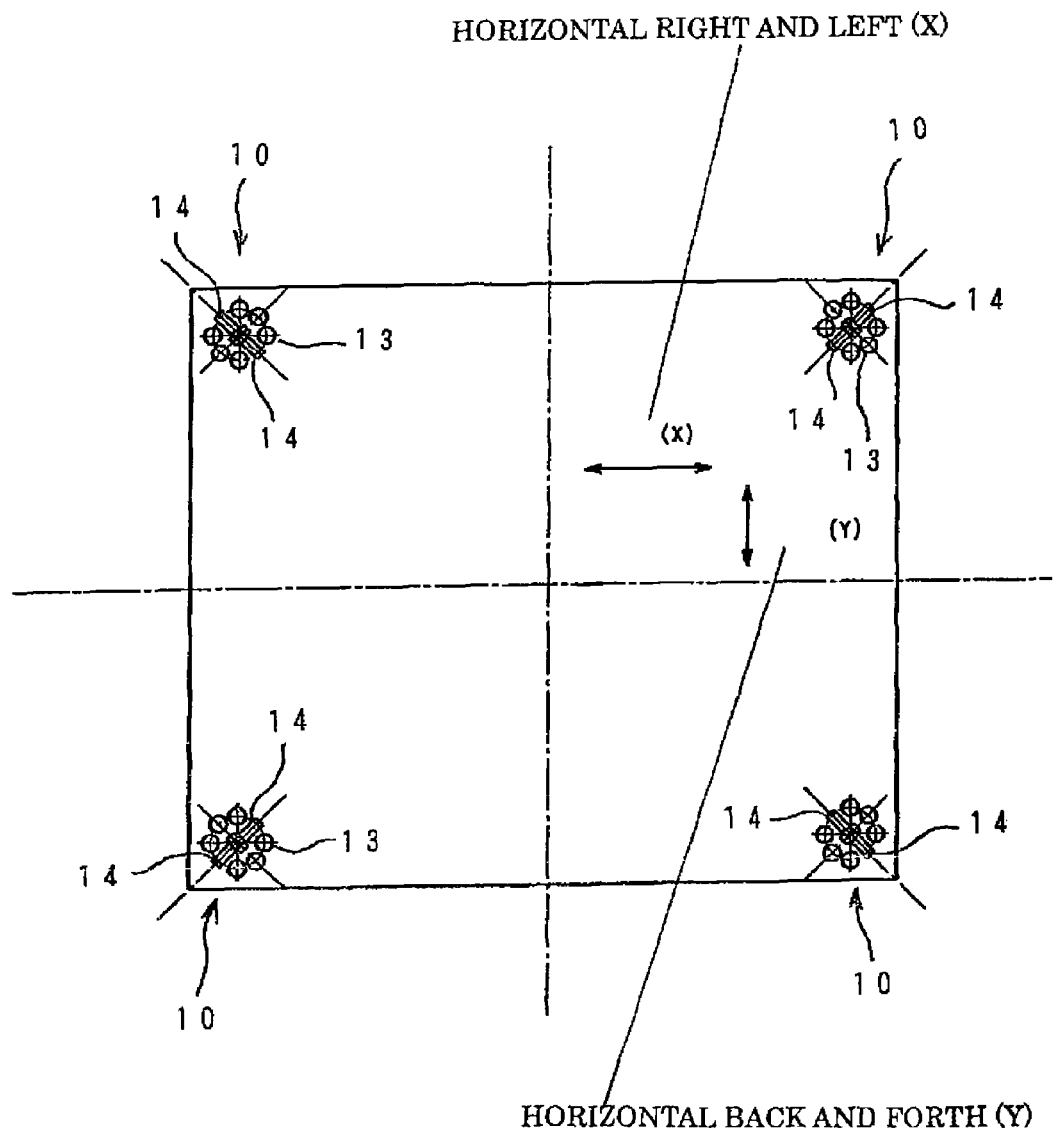
FIG. 3 is a schematic side view showing a use example of the vibration isolation device in FIG. 1.

Then, in an actual use example, preferably as shown in FIG. 3, the four vibration isolation devices 10 are arranged at four corners on the lower face of the equipment 15 whose vibration should be eliminated so that the respective viscoelastic bodies 21 are oriented toward the gravity center position G in the vicinity of the center of the equipment 15. By this, oscillation of the primary rotation acting on the equipment 15 in the horizontal direction is effectively restrained by the viscoelastic bodies 21 with respect to the gravity center position G, and oscillation in the X direction and the Y direction is restrained.

Figure 4:
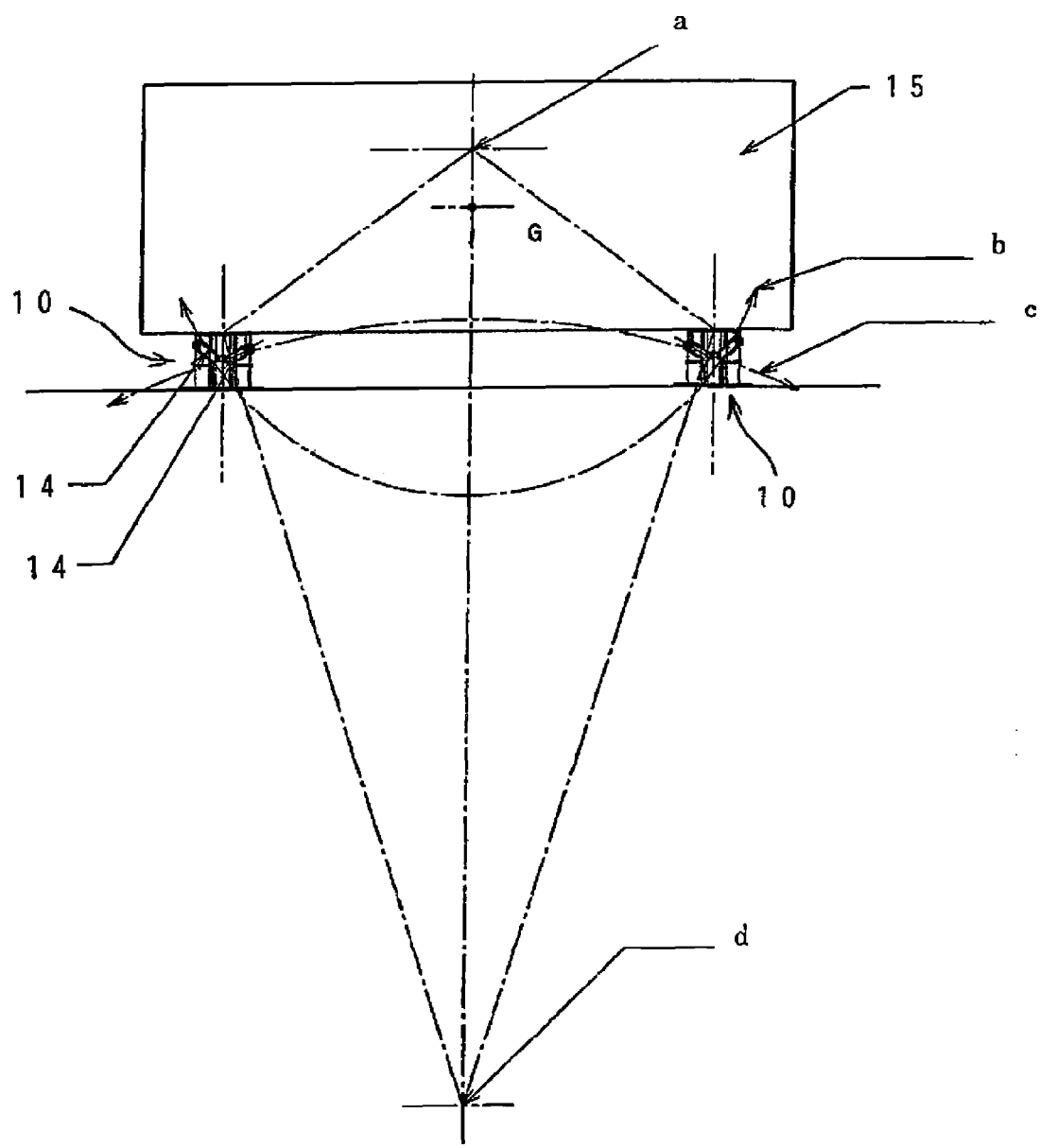
FIG. 4 is a schematic view showing a rigid body mode when a spring constant ratio Kh/Kz is changed in the use example in FIG. 3.

In this case, when the inclination of the inner viscoelastic bodies 21 in each of the vibration isolation devices 10 is selected so that it matches the tangent direction approximately perpendicular to the center of the primary rotation and when the inclination of the outer viscoelastic bodies 21 in each of the vibration isolation devices 10 is selected so that it matches the tangent direction approximately perpendicular to the center of the secondary rotation, respectively, as shown in FIG. 4, oscillations by the primary rotation and the secondary rotation can be more effectively damped by the respective corresponding viscoelastic bodies 21. At that time, since the natural frequency of the secondary rotation is higher than that of the primary rotation, a stronger damping effect can be obtained by using the viscoelastic body 21 with a larger damping force.

In FIG. 4, the alphabetic reference characters can be described as follows:
  a: Secondary Center of Rotation
  b: Torsional Direction of Secondary Rotation
  c: Torsional Direction of Primary Rotation
  d: Primary Center of Rotation
  G: Center of Gravity Position Here, the viscoelastic body 21 has a strong damping force in the direction perpendicular to the longitudinal direction but does not have a strong damping force in the longitudinal direction. By this, the vibration resistant effect can be controlled in the direction perpendicular to the longitudinal direction. Therefore, a vibration isolation device with an appropriate damping force can be provided when vibration in the vertical direction of a high frequency is large due to electromechanical equipment with respect to the vibration of a clean room or the like, for example. That is, when the viscoelastic body was arranged vertically, since a horizontal damping force was adjusted by compressing the viscoelastic body with an adjusting screw or by changing an effective length in the longitudinal direction in order to obtain a horizontal damping force, a large horizontal damping force could not be obtained, and further the damping force in the vertical direction was also changed accompanied with the adjustment of the damping force in the horizontal direction. On the other hand, according to the vibration isolation device 10 of this embodiment of the present invention, since the viscoelastic body 21 is arranged with inclination and a damping force by bending deformation of the viscoelastic body 21 can be obtained with respect to the vertical direction, a strong damping force in the horizontal direction can be obtained without largely increasing the damping force in the vertical direction.

Here, the lower end of each of the viscoelastic bodies 21 is not fixed to the inclined faces 22a, 22b of the receiving mount 22, respectively, by adhesion or the like, but the receiving plates 21a, 21b are stuck. And with regard to these receiving plates 21a, 21b, the adjusting screws 24a, 24b are removed before the equipment 15 is loaded on the vibration isolation device 10, and as shown in FIG. 1, they are pulled by tension springs 25a, 25b and housed into the hollow cylinder portions 23a, 23b.

Moreover, the inclined faces 22a, 22b of the receiving mount 22 are provided with displacement preventing members 22c, 22d on their top portions, respectively. By this, when the lower end of the viscoelastic body 21 is displaced upward in contact with the inclined faces 22a, 22b of the receiving mount 22, the lower end of the viscoelastic body 21 is not displaced from the inclined faces 22a, 22b of the receiving mount 22.

The vibration isolation device 10 according to this embodiment of the present invention is constructed as above, and in case of vibration isolation for the equipment 15 such as an electronic microscope, for example, the equipment 15 is fixed/held on the upper face of the upper plate 12 as shown in FIG. 4. By this, when the lower plate 11 is vibrated, the vibration of the lower plate 11 is absorbed by each of the compression coil springs 13, and vibration of the upper plate 12 and the equipment 15 can be restrained.

Figure 5:
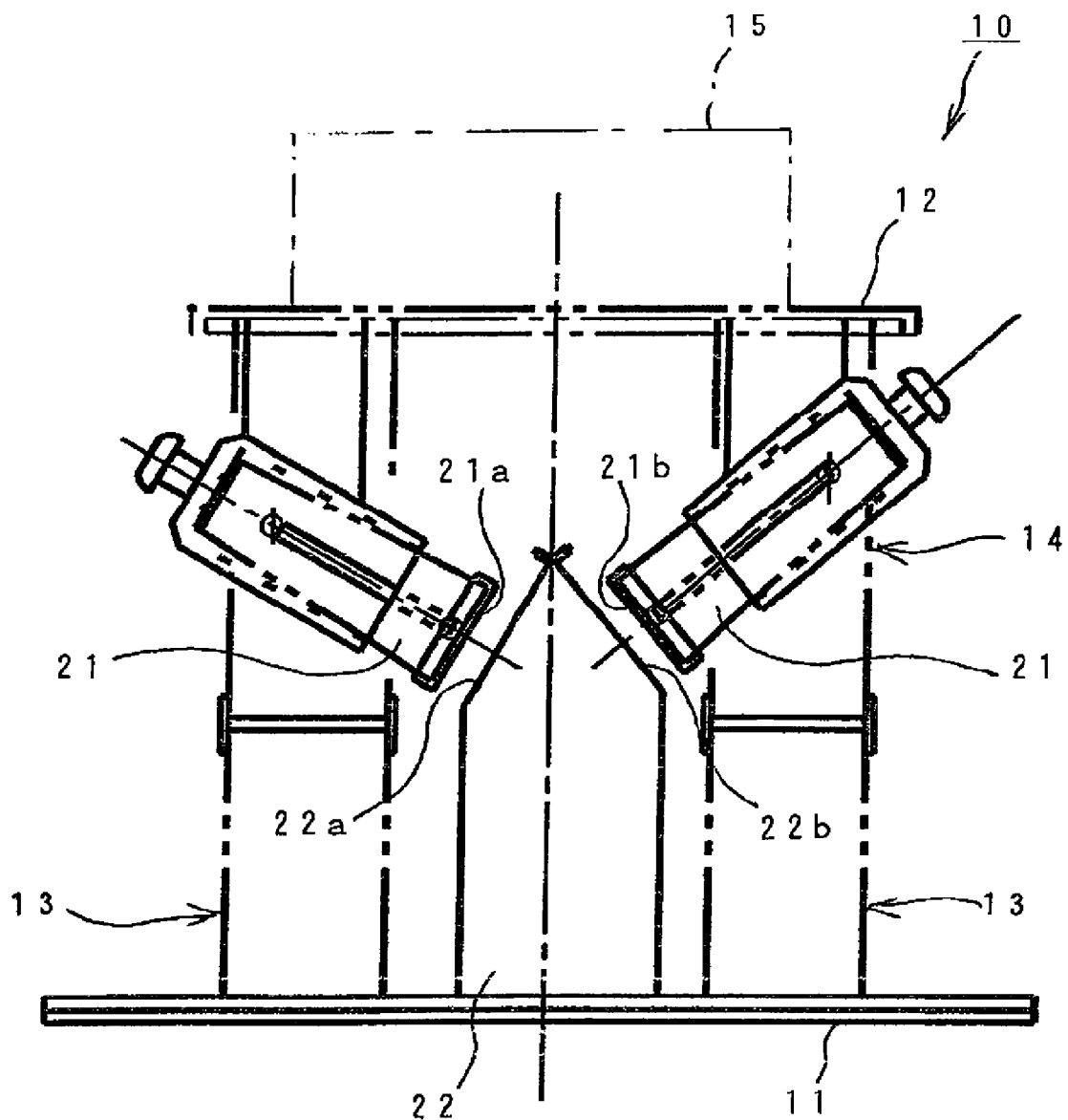
FIG. 5 is a schematic side view showing a state after the device is loaded in the vibration isolation device in FIG. 1.

In this case, in each of the viscoelastic bodies 21 of the viscoelastic body 14, its lower end is not fixed to the inclined faces 22a, 22b of the receiving mount 22 by adhesion or the like and moreover, pulled by the tension springs 25a, 25b into the hollow cylinder portions 23a, 23b and housed therein. Therefore, when the respective compression coil springs 13 do not receive a load of the equipment 15 before loading of the equipment 15, as shown in FIG. 1, the lower ends of the respective viscoelastic bodies 21 are floated from the inclined faces 22a, 22b of the opposing receiving mount 22, respectively. On the other hand, when the equipment 15 is loaded, the respective compression coil springs 13 are compressed by the load of the equipment 15, and as shown in FIG. 5, the lower ends of the respective viscoelastic bodies 21 are positioned opposite the inclined faces 22a, 22b of the opposing receiving mount 22.

Then, the adjusting screws 24a, 24b are mounted in this state. By adjustment, the lower ends of the respective viscoelastic bodies 21 are brought into contact with the corresponding inclined faces 22a, 22b of the receiving mount 22, respectively, and act as the viscoelastic bodies. At that time, before and after the loading of the equipment 15, the height position of the lower ends of the respective viscoelastic bodies 21 against the inclined faces 22a, 22b of the receiving mount 22 is changed by expansion/contraction of the respective compression coil springs 13. But even if the equipment 15 is removed and the lower ends of the respective viscoelastic bodies 21 slide along the corresponding inclined faces 22a, 22b of the receiving mount 22 in the state where the lower ends of the respective viscoelastic bodies 21 are in contact with the corresponding inclined faces 22a, 22b of the receiving mount 22, since 22c, 22d are provided on the upper ends of the respective inclined faces 22a, 22b, the lower ends of the respective viscoelastic bodies 21 are not displaced upward from the corresponding inclined faces 22a, 22b of the receiving mount 22.

Figure 6:
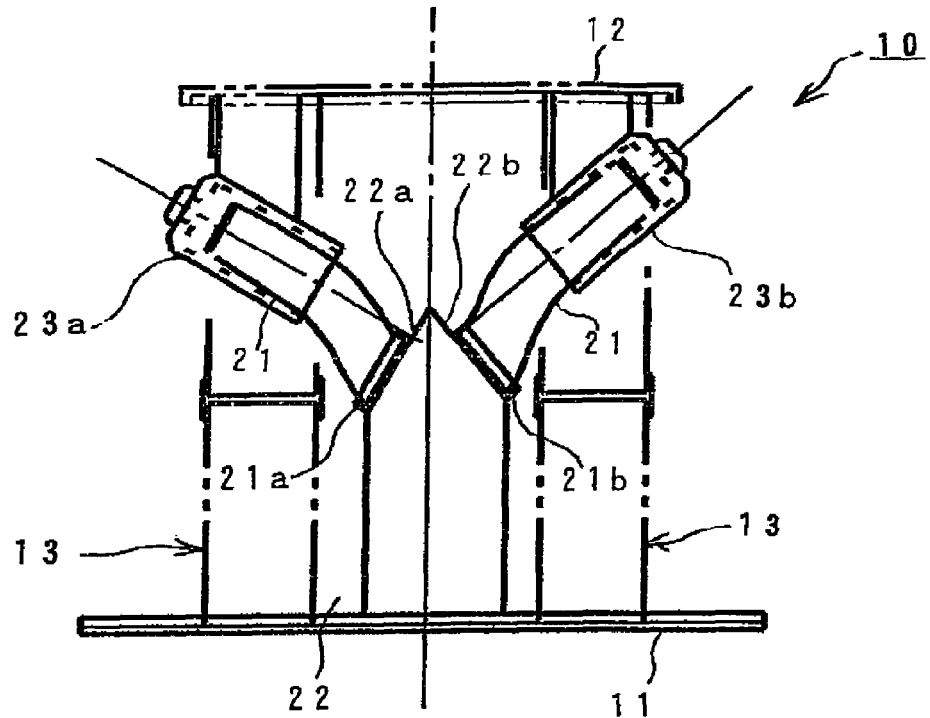
FIGS. 6A and 6B are schematic side views showing states (A) before the device is loaded and (B) after the device is loaded when the lower ends of the viscoelastic bodies are stuck to the inclined faces of the receiving mount in the vibration isolation device in FIG. 1, respectively.
Figure 6:
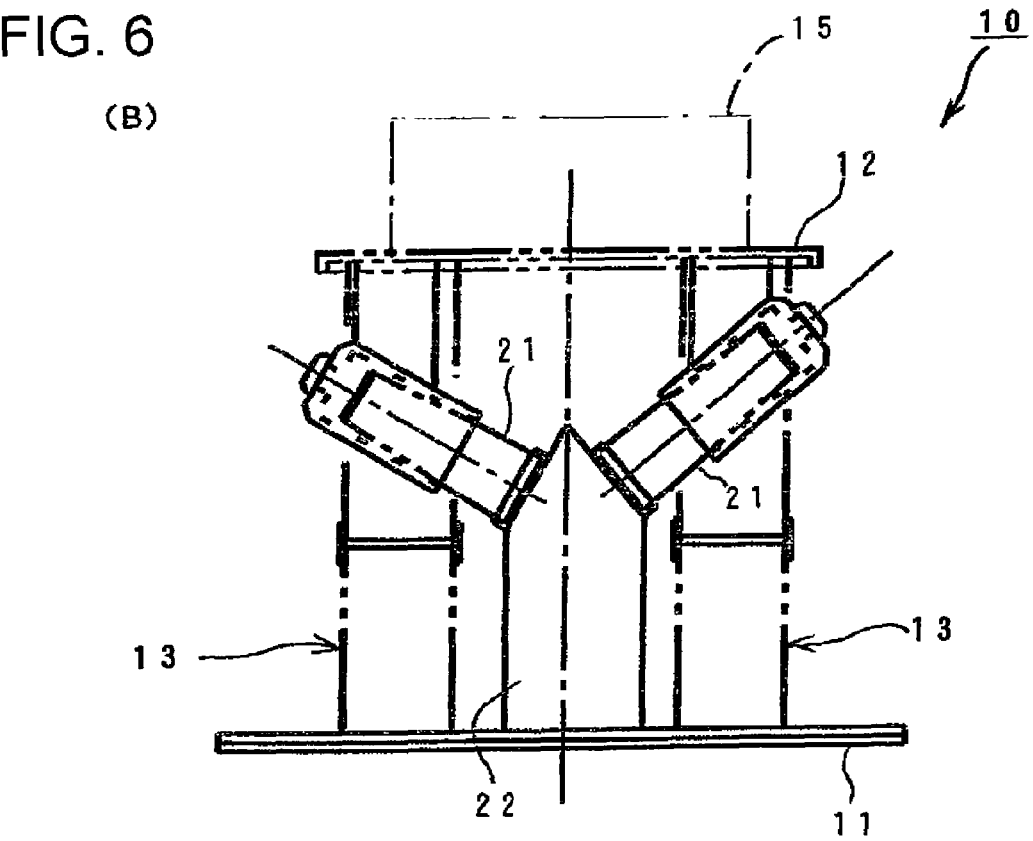

On the other hand, as shown in FIG. 6, when the lower ends of the respective viscoelastic bodies 21 are fixed to the positions when the device is loaded opposite the corresponding inclined faces 22a, 22b of the receiving mount 22 by adhesion or the like, the respective viscoelastic bodies 21 are straight on the center axes of the hollow cylinder portions 23a, 23b when the device is loaded as shown in FIG. 6B, but before the device loading, stress concentrates on the side faces in the vicinity of the lower ends of the respective viscoelastic bodies 21 as shown in FIG. 6A, and the viscoelastic bodies 21 might be destroyed in some cases.

Also, as shown in FIG. 7, when the lower ends of the respective viscoelastic bodies 21 are not fixed by adhesion or the like but in contact with the corresponding inclined faces 22a, 22b of the receiving mount 22, the respective viscoelastic bodies 21 are straight on the center axes of the hollow cylinder portions 23a, 23b when the device is loaded as shown in FIG. 7A, but the lower ends are in contact with the upper part of the corresponding inclined faces 22a, 22b of the receiving mount 22.

Then, as shown in FIG. 7B, after the device loading, when the lower ends of the respective viscoelastic bodies 21 are to move downward along the corresponding inclined faces 22a, 22b of the receiving mount 22, the contact faces corresponding to the inclined faces 22a, 22b tend to remain due to a frictional force. By this, the vicinity of the lower end is deformed as the viscoelastic body 21 shown in the right of FIG. 7B, and if device loading is repeated, the lower ends of the viscoelastic bodies 21 are gradually displaced upward with respect to the corresponding inclined faces 22a, 22b of the receiving mount 22, and as the viscoelastic body 21 shown in the left of FIG. 7B, the lower end might be removed from the inclined faces 22a, 22b of the receiving mount 22.

Figure 8:
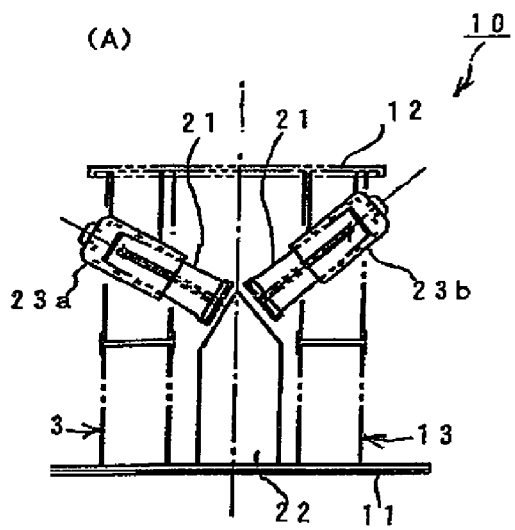
FIGS. 8A to 8D are schematic side views showing states (A) before the device is loaded, (B) after the device is loaded, (C) after the device is removed, and (D) after the device is re-loaded when the adjusting screw is mounted in the vibration isolation device in FIG. 1, respectively.
Figure 8:
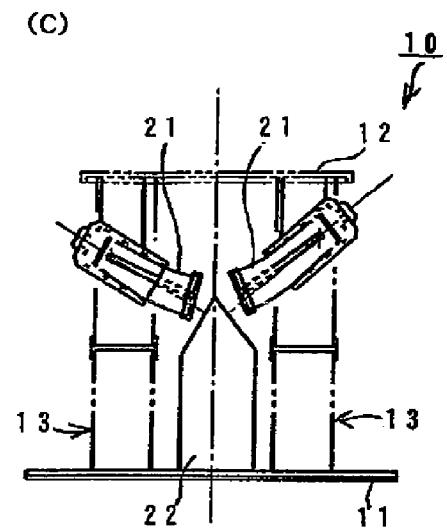
Figure 8:
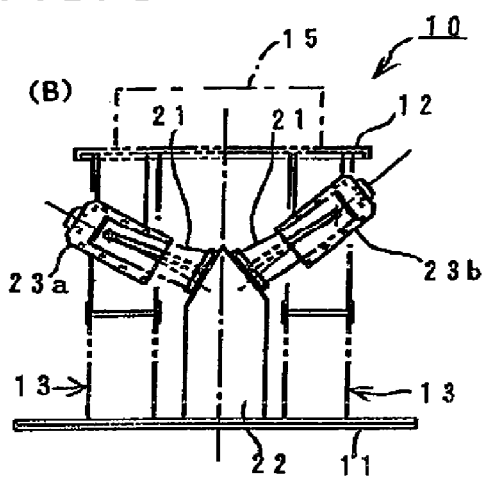
Figure 8:
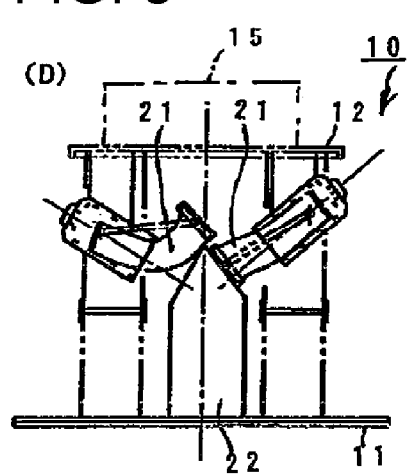

Moreover, as shown in FIG. 8, when the respective viscoelastic bodies 21 are pulled and housed in the hollow cylinder portions 23a, 23b by the tension springs 25a, 25b with the adjusting screws 24a, 24b attached, when the respective compression coil springs 13 do not receive the load of the equipment 15 as shown in FIG. 8A as with the case of the vibration isolation device 10 according to this embodiment of the present invention before the device loading, the lower ends of the respective viscoelastic bodies 21 are floated from the respective inclined faces 22a, 22b of the opposing receiving mount 22.

On the other hand, when the equipment 15 is loaded, since the respective viscoelastic bodies 21 are pressed by the adjusting screws 24a, 24b in the direction of the lower end as shown in FIG. 8B, the lower ends of the respective viscoelastic bodies 21 are brought into contact with the inclined faces 22a, 22b of the receiving mount 22 in the middle of downward movement of the upper plate 12, whereby the vicinity of the lower ends of the respective viscoelastic bodies 21 are slightly deformed. Then, when the equipment 15 is removed after that, the respective viscoelastic bodies 21 are separated from the corresponding inclined faces 22a, 22b of the receiving mount 22 in the deformed state as shown in FIG. 8C. Therefore, as with the case in FIG. 7, the vicinity of the lower end is deformed as the viscoelastic body 21 shown in the right of FIG. 8D, and if the device loading is repeated, the lower end of the viscoelastic body 21 is gradually displaced upward with respect to the corresponding inclined faces 22a, 22b of the receiving mount 22, and the lower end might be removed from the inclined faces 22a, 22b of the receiving mount 22 as the viscoelastic body 21 shown in the left of FIG. 8D.

On the other hand, according to the vibration isolation device 10 of the present invention, since the lower ends of the respective viscoelastic bodies 21 are not moved vertically in contact with the corresponding inclined faces 22a, 22b of the receiving mount 22 by the loading of the equipment 15, even if the device loading is repeated, the lower ends of the respective viscoelastic bodies 21 are not removed from the corresponding inclined faces 22a, 22b of the receiving mount 22. Also, even if the loading of the equipment 15 is repeated in the state where the respective viscoelastic bodies 21 are pressed in the direction of the lower end by the adjusting screws 24a, 24b, since the displacement preventing plates 22c, 22d are provided at the upper ends of the inclined faces 22a, 22b of the receiving mount 22 to which the lower ends of the respective viscoelastic bodies 21 correspond, the respective viscoelastic bodies 21 are not removed upward.

Embodiment 2

Figure 9:
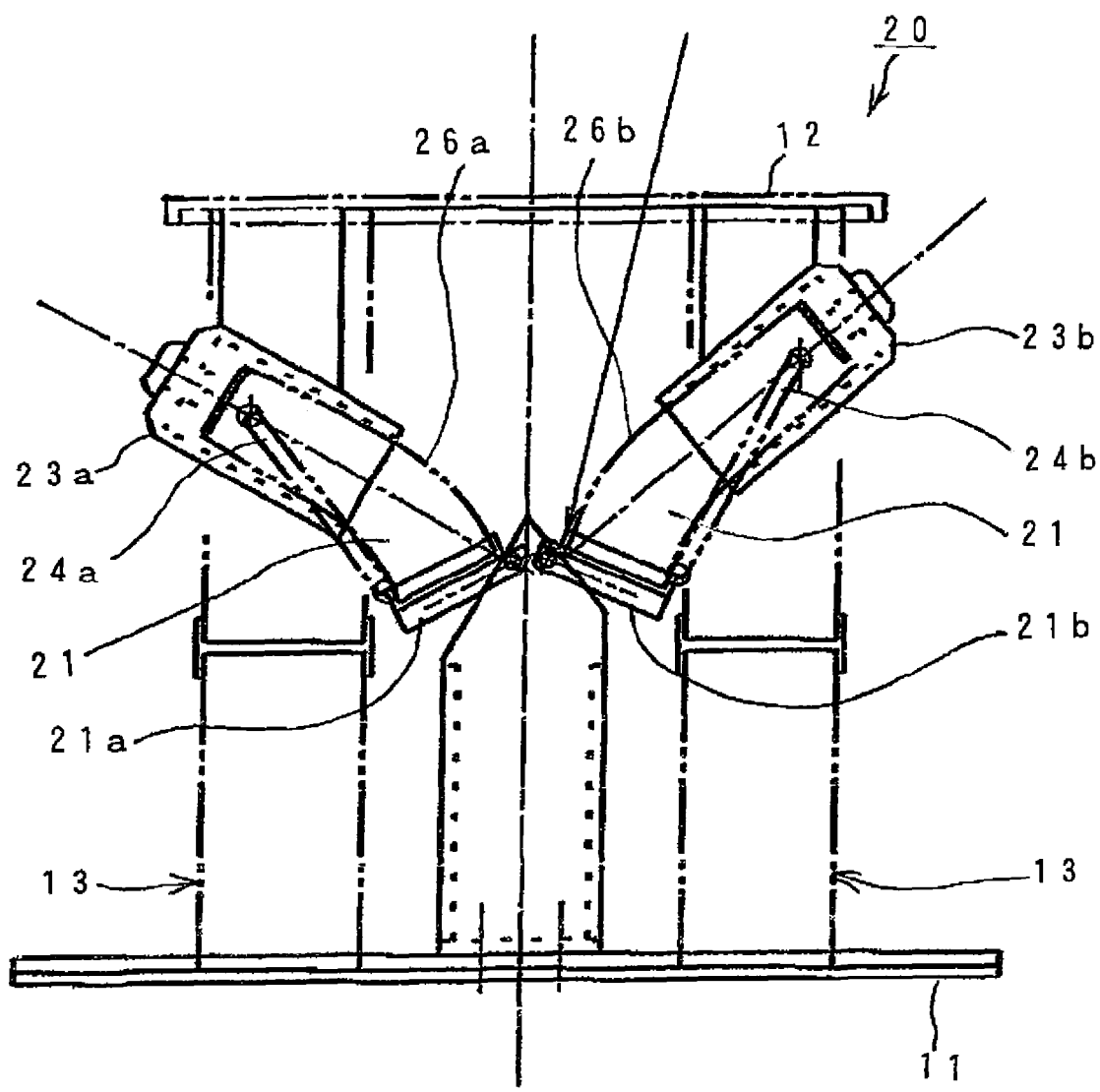
FIG. 9 is a schematic side view showing a construction of a 2nd embodiment of the vibration isolation device according to the present invention.

FIG. 9 shows a construction of a second embodiment of the vibration isolation device according to the present invention. In FIG. 9, a vibration isolation device 20 has substantially the same construction as that of the vibration isolation device 10 shown in FIG. 1, and the same reference numerals are attached to the same components and the description thereof will be omitted. The above vibration isolation device 20 has a different construction from the vibration isolation device 10 shown in FIG. 1 only in the following points. That is, in the above vibration isolation device 20, the receiving plates 21a, 21b mounted at the lower ends of the respective viscoelastic bodies 21 constituting the viscoelastic body 14 are pivotally supported by hinges 26a, 26b in the vicinity of the upper ends of the corresponding inclined faces 22a, 22b of the receiving mount 22 at the side edges of the respective upper parts.

By this, when the lower ends of the above respective viscoelastic bodies 21 are pulled by the tension springs 25a, 25b into the hollow cylinder portions 23a, 23b and housed therein, since the lower ends of these viscoelastic bodies 21 are pivotally supported by the hinges 26a, 26b at the upper part with respect to the inclined faces 22a, 22b of the receiving mount 22, the lower parts of the lower ends of the respective viscoelastic bodies 21 are floated from the surfaces of the inclined faces 22a, 22b of the receiving mount 22 at their lower part as shown in FIG. 9 before the device loading.

According to the so constructed vibration isolation device 20, it acts similarly to the vibration isolation device 10 shown in FIG. 1 so as to effectively restrain horizontal oscillation and also damps vertical oscillation by damping action of the viscoelastic body 24, and the horizontal oscillation can be further effectively restrained.

Here, in the respective viscoelastic bodies 21 of the above viscoelastic body 14, the receiving plates 21a, 21b mounted at the lower end are, as shown in FIG. 9, pivotally supported by the hinges 26a, 26b at the upper edges in the vicinity of the upper ends of the inclined faces 22a, 22b of the receiving mount 22 before loading of the device, and the lower ends are floated from the inclined faces 22a, 22b of the receiving mount 22. Thus, the stress concentration on the lower parts of the lower ends of the respective viscoelastic bodies 21 can be alleviated, and destruction due to stress of the respective viscoelastic bodies 21 can be prevented. Also, in this case, since the adjusting screws 24a, 24b are kept mounted at the upper ends of the respective viscoelastic bodies 21, attaching/removing operation of the adjusting screws 24a, 24b before and after the device loading is not needed any more.

Figure 10:
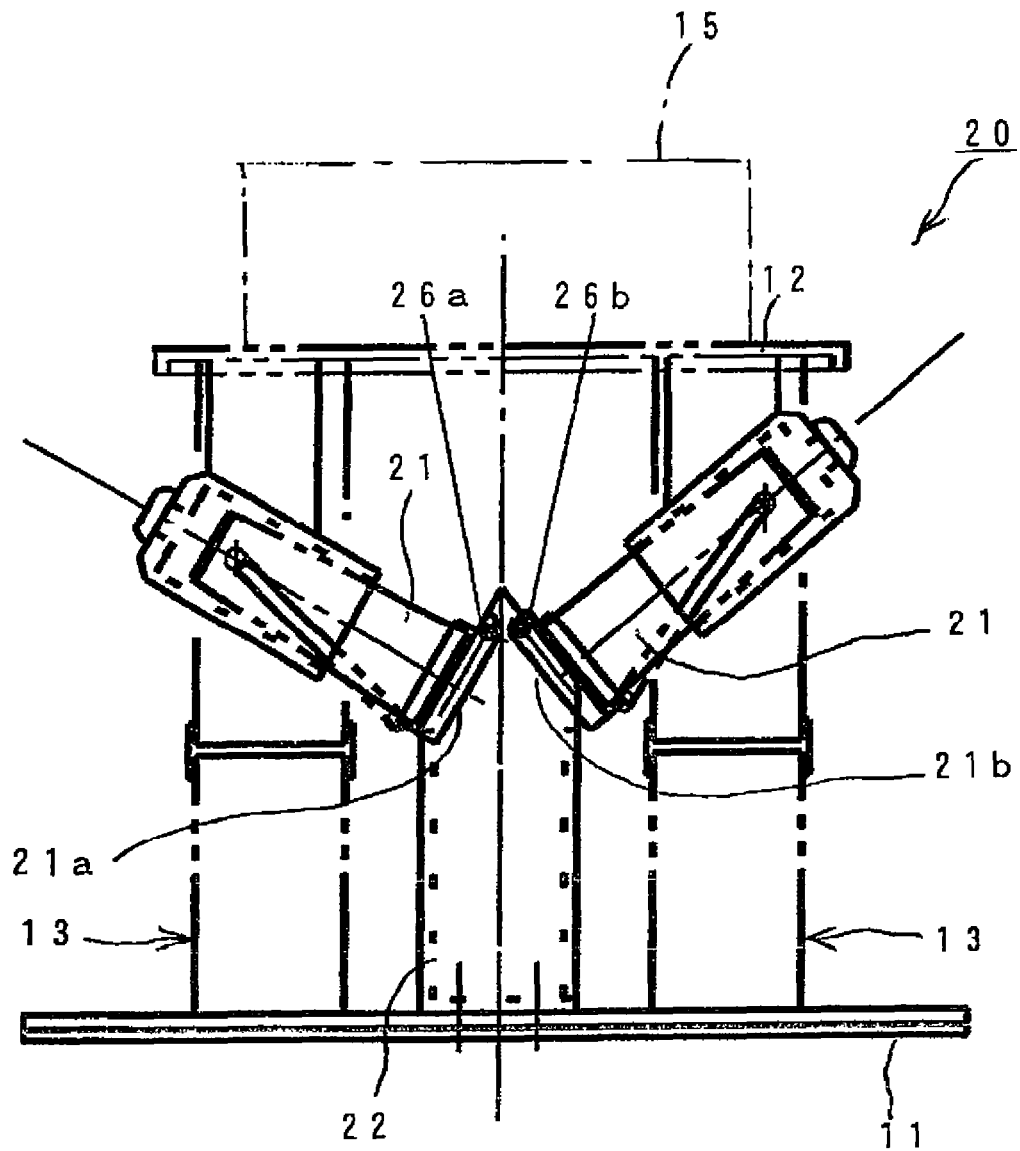
FIG. 10 is a schematic side view showing the state after the device is loaded in the vibration isolation device in FIG. 9.

Then, when the equipment 15 is loaded, the respective compression coil springs 13 are compressed by the load of the equipment 15, and as shown in FIG. 10, the lower ends of the respective viscoelastic bodies 21 are brought closer to the inclined faces 22a, 22b of the opposing receiving mount 22. At that time, when the receiving plates 21a, 21b are rotationally moved around the hinges 26a, 26b, the lower ends of the respective viscoelastic bodies 21 are opposed and brought into contact with the inclined faces 22a, 22b of the opposing receiving mount 22 and function as the viscoelastic body.

In this case, before and after loading of the equipment 15, the lower ends of the respective viscoelastic bodies 21 are brought closer to, brought into contact with or separated from the inclined faces 22a, 22b of the receiving mount 22 by expansion/contraction of the respective compression coil springs 13, but when the equipment 15 is removed while the lower ends of the respective viscoelastic bodies 21 are in contact with the corresponding inclined faces 22a, 22b of the receiving mount 22, the receiving plates 21a, 21b mounted at the lower ends of the respective viscoelastic bodies 21 do not slide over the corresponding inclined faces 22a, 22b of the receiving mount 22 but are rotationally moved around the hinges 26a, 26b. Therefore, the lower ends of the respective viscoelastic bodies 21 do not slide along the inclined faces 22a, 22b of the above receiving mount 22 and thus, even if loading of the equipment 15 is repeated, the lower ends of the respective viscoelastic bodies 21 are not removed from the inclined faces 22a, 22b of the receiving mount 22.

They are arranged so as not to be removed upward even if a plate is provided perpendicularly to the inclined face of a receiving plate above the receiving plates 21a, 21b mounted at the lower ends of the respective viscoelastic bodies 21 and the lower end of the viscoelastic body is fixed to the receiving plate by adhesion or the like.

Embodiment 3

Figure 11:
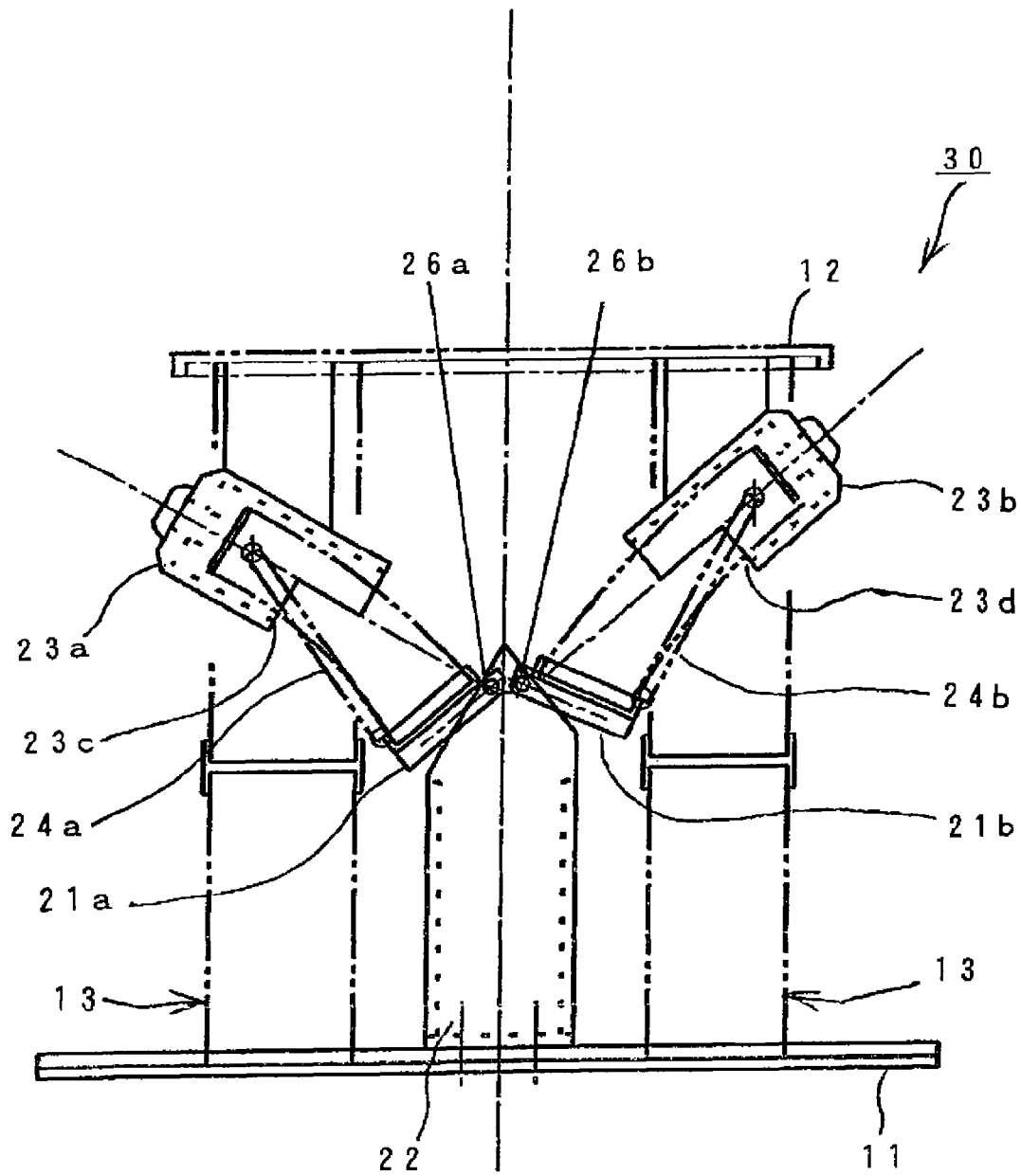
FIG. 11 is a schematic side view showing a construction of a 3rd embodiment of the vibration isolation device according to the present invention.
Figure 13:
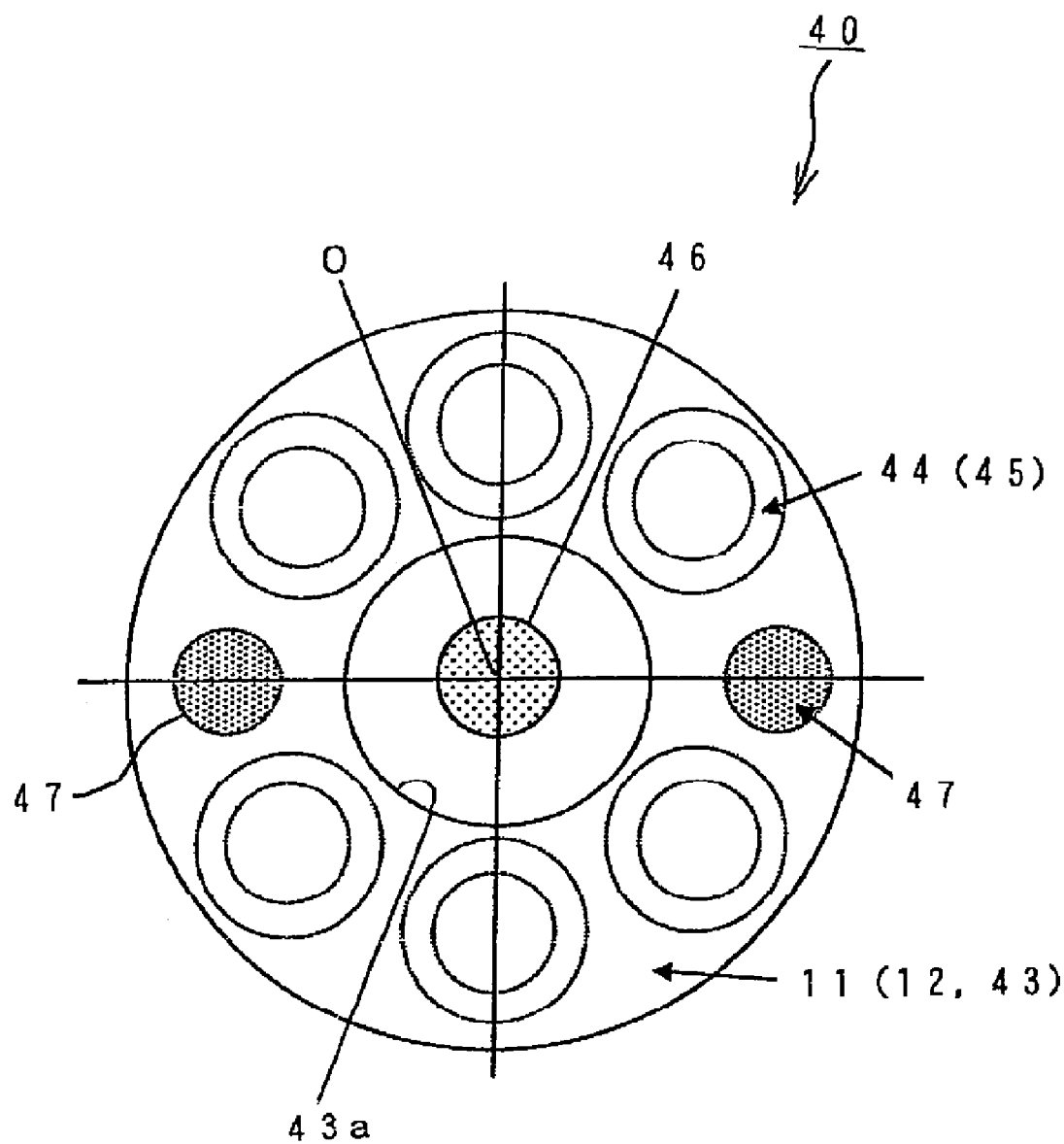
FIG. 13 is a schematic plan view showing arrangement of lower springs, upper springs and first and second viscoelastic bodies in the vibration isolation device in FIG. 12.
Figure 15:
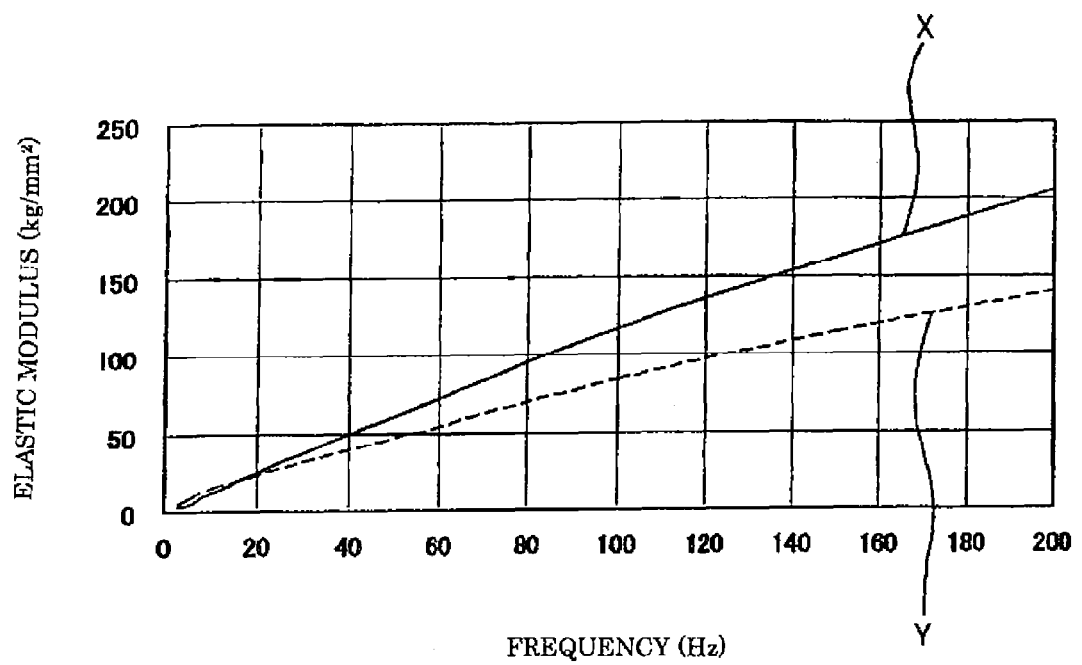
FIG. 15 is a graph showing a frequency characteristic of a material of a longitudinal elastic modulus of the second viscoelastic body in the vibration isolation device in FIG. 12.

FIG. 11 shows a construction of a third embodiment of the vibration isolation device according to the present invention. In FIG. 13, a vibration isolation device 30 has the same construction as that of the vibration isolation device 20 shown in FIG. 9, the same reference numerals are attached to the same components and the description will be omitted. The above vibration isolation device 30 has a different construction from the vibration isolation device 20 shown in FIG. 9 in the point that notch portions 23c, 23d are provided on the side walls at the lower parts of the hollow cylinder portions 23a, 23b.

Concerning with the above respective notch portions 23c, 23d, longer portions with respect to the longitudinal direction of the respective viscoelastic bodies 21 are deformed when the receiving plates 21a, 21b mounted at the lower ends of the respective viscoelastic bodies 21 are rotationally moved by the hinges 26a, 26b.

According to the so constructed vibration isolation device 30, it acts similarly to the vibration isolation device 20 shown in FIG. 9 and also, when the respective viscoelastic bodies 21 are pulled by the tension springs 25a, 25b into the hollow cylinder portions 23a, 23b and housed therein in the state where the respective compression coil springs 13 are extended before loading of the device, since the receiving plates 21a, 21b mounted at the lower ends of the respective viscoelastic bodies 21 are pivotally supported by the hinges 26a, 26b in the vicinity of the upper edges of the inclined faces 22a, 22b of the receiving mount 22. Thus, when the lower parts of the receiving plates 21a, 21b are floated, due to provision of the notch portions 23c, 23d at the respective hollow cylinder portions 23a, 23b, the respective viscoelastic bodies 21 protrude outward of the hollow cylinder portions 23a, 23b from the portions of the above notch portions 23c, 23d. Therefore, since deformation of the respective viscoelastic bodies 21 is generated in the portions longer in the axial direction, the stress acting on the respective viscoelastic bodies 21 is reduced and contact pressure on the hollow cylinder portions 23a, 23b of the respective viscoelastic bodies 21 is restrained, whereby, destruction of the respective viscoelastic bodies 21 can be reduced.

In this way, according to the present invention, since the natural frequency in the horizontal direction is lowered by relatively increasing the deflection amount in the horizontal direction using the compression coil springs with a small deflection amount in the vertical direction, vibration resistant effect in the horizontal direction is improved and moreover, vibration in the horizontal direction can be absorbed by the inclined arrangement of the viscoelastic bodies. Moreover, since the contact positions of the lower ends of the respective viscoelastic bodies with respect to the inclined faces of the receiving mount are not displaced before and after the loading of the device, repetition of device loading does not cause the lower ends of the respective viscoelastic bodies to be removed from the inclined faces of the receiving mount nor the respective viscoelastic bodies to be destroyed.

Further, preferred other embodiments of the present invention will be described below in detail referring to FIGS. 12 to 16. Incidentally, the embodiments described below are preferred embodiments of the present invention and technically preferable various limitations are applied but the scope of the present invention is not limited to those modes unless otherwise specified to limit the present invention in the following description.

Embodiment 4

Figure 12:
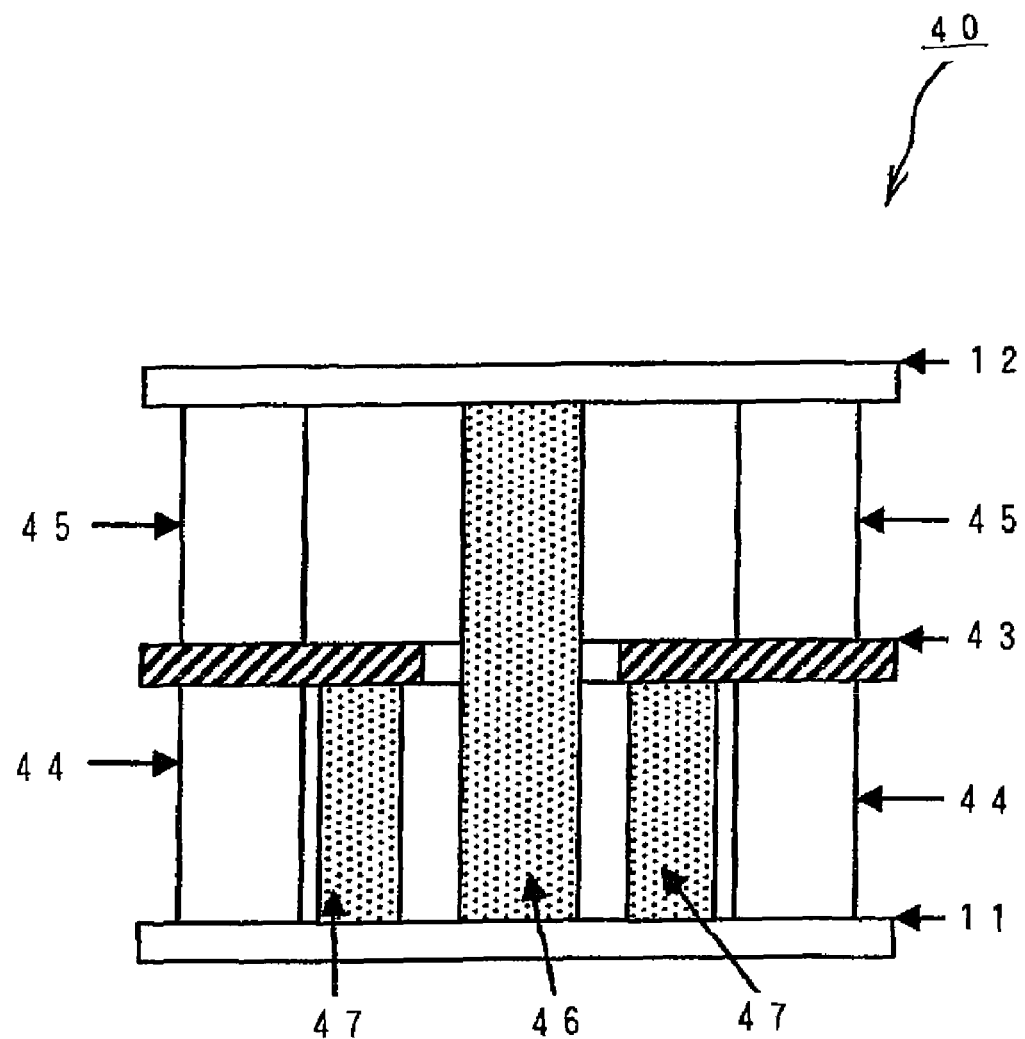
FIG. 12 is a schematic side view showing a construction of a $4^{th}$ embodiment of the vibration isolation device according to the present invention.

FIGS. 12 and 13 show a construction of a 4th embodiment of the vibration isolation device according to the present invention. In FIGS. 12 and 13, a vibration isolation device 40 comprises a lower plate 11, an upper plate 12, an intermediate plate 43 arranged between the lower plate 11 and the upper plate 12, six first compression coil springs (lower springs) 44 and the second compression coil springs (upper springs) 45 arranged between the lower plate 11 and the intermediate plate 43 and between the intermediate plate 43 and the upper plate 12, respectively, a single first viscoelastic body 46 connecting the lower plate 11 and the upper plate 12 to each other through a through hole 43a at the center of the intermediate plate 43, and further a pair of second viscoelastic bodies 47 connecting the lower plate 11 and the intermediate plate 43 to each other.

The lower plate 11 is comprised by a flat plate, for example, fixedly arranged horizontally. The upper plate 12 is similarly comprised by a flat plate, for example, and arranged horizontally above the lower plate 11 with a predetermined interval. Moreover, the upper plate 12 supports a supported object (electronic microscope, for example) such as a structure loaded on its upper face.

The lower springs 44 and the upper springs 45 are arranged on the circumference of a predetermined radius with respect to a center line O passing vertically the lower plate 11 and the upper plate 12 so that they extend in the vertical direction in parallel with the center line O, respectively, at positions in point symmetry as shown in FIG. 13. Specifically, in the illustrated case, the lower springs 44 and the upper springs 45 are arranged at six positions among those with an equiangular interval of 45 degrees with respect to the center line O except the right and left positions opposite to each other.

Here, as for the lower springs 44 and the upper springs 45, the elastic center of each of the upper springs 45 is arranged coaxially with the elastic center of the lower spring 44 so as to form the two-stage construction.

Here, each of the lower springs 44 and upper springs 45 uses a spring with a free length longer than the outer diameter of each of the springs.

Note that the respective lower springs 44 and upper springs 45 have their lower ends and the upper ends fixed to the lower plate 11 and the intermediate plate 43 as well as the intermediate plate 43 and the upper plate 12, respectively. Here, the fixation of the respective lower springs 44 and upper springs 45 to the lower ends and upper ends of the corresponding lower plate 11, the intermediate plate 43 or the intermediate plate 43 and the upper plate 12 is realized by forming fitting grooves or caps conforming to the spring outer diameter at the fixation positions of the respective compression coil springs 43 of the lower plate 11 or the upper plate 12, inserting the lower end or the upper end of the lower spring 44 and the upper spring 45 into the fitting groove or cap and by fixing/holding them by adhesion or the like.

The above first viscoelastic body 46 is formed from a material having viscoelasticity such as a thermoplastic resin or a thermosetting resin, for example, and in the illustrated case, it is formed in an elongated cylinder shape. Further, the first viscoelastic body 46 is inserted through the through hole 43a at the center of the intermediate plate 43, and the lower end is fixed to the center on the upper face of the lower plate 11 and the upper end to the center on the lower face of the upper plate 12, respectively, by adhesion or the like.

For the above second viscoelastic body 47, a material in the glass transition zone under the operating temperature condition of an electronic microscope or the like is selected. By this, the second viscoelastic body 47 has a tendency as shown in a table in FIG. 14 and a graph in FIG. 15 that the longitudinal elastic modulus, that is, the storage elastic modulus X and the loss elastic modulus Y become higher as the frequency becomes higher and has a characteristic that it is relatively flexible in a low frequency range and relatively hard in a high frequency range. And the second viscoelastic body 47 has its lower end and upper end fixed to the upper face of the lower plate 11 and the lower face of the intermediate plate 43, respectively, by adhesion or the like at angular positions where the lower springs 44 are not arranged between the lower plate 11 and the intermediate plate 43.

The vibration isolation device 40 of this embodiment of the present invention is constructed as above, and when vibration isolation of equipment 48 such as an electronic microscope is to be performed, for example, the equipment 48 is fixedly held on the upper face of the upper plate 12. By this, the respective lower coil springs 44 and the upper coil springs 45 constructed in two stages between the lower plate 11 and the upper plate 12 have their natural frequency in the horizontal direction set at a frequency lower than that in the vertical direction, and when the lower plate 11 is vibrated, the vibration of the upper plate 12 and the equipment 48 in the horizontal direction can be effectively restrained and the oscillation in the vertical direction is damped by the damping action of the first viscoelastic body 46.

Moreover, the resonance in the relatively high frequency range generated in the intermediate plate 43 can be restrained by the damping action of the second viscoelastic body 47. Therefore, the resonance by the machine mode caused by the load, the mount and the internal structure of the vibration isolation device can be effectively restrained.

The vibration isolation effect of the vibration isolation device 40 by a dummy load is calculated below. Supposing Kc1 is a spring constant (kg/mm) of the lower spring 44, Kc2 is a spring constant (kg/mm) of the upper spring 45, Km1 is a storage spring constant (kg/mm) of the first viscoelastic body 46, and Km2 is a storage spring constant (kg/mm) of the second viscoelastic body 47, a spring constant K of the entire vibration isolation device 40 is represented by:

$$K = \frac{(Kc1 + Km2) \times Kc2}{(Kc1 + Km2) + Kc2} + Km1 \quad (kg/mm) \tag{1}$$

Figure 18:
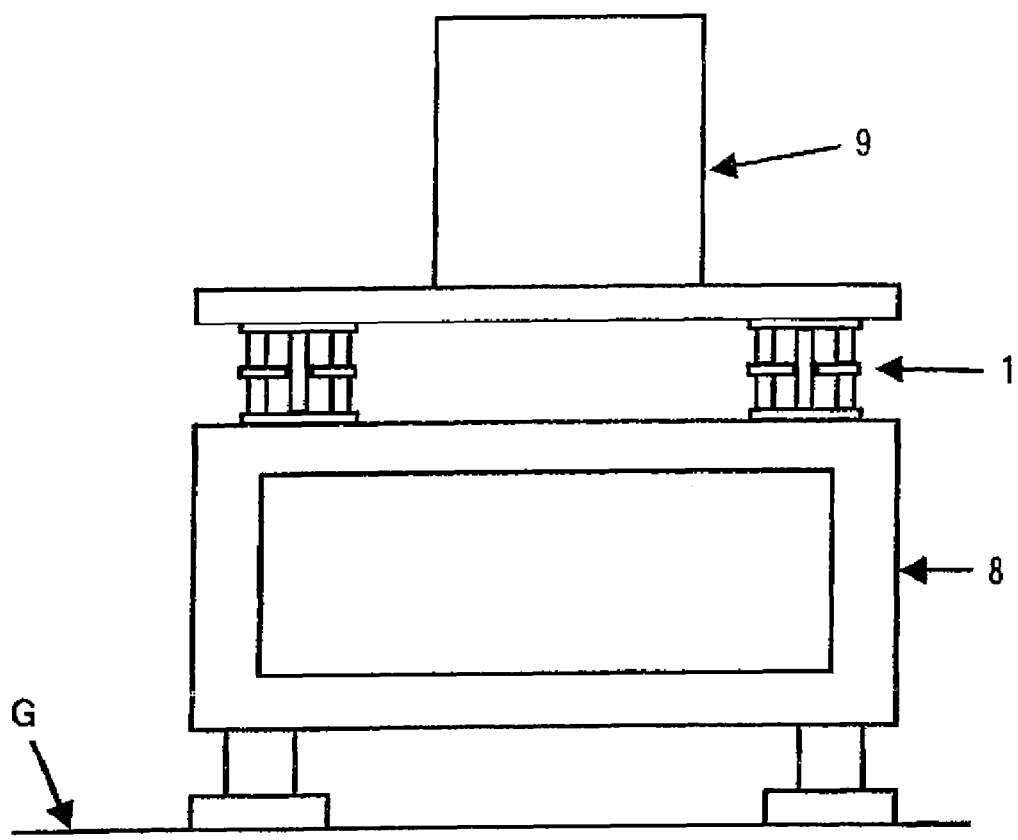
FIG. 18 is a schematic side view showing a use example in the vibration isolation device in FIG. 17.
Figure 19:
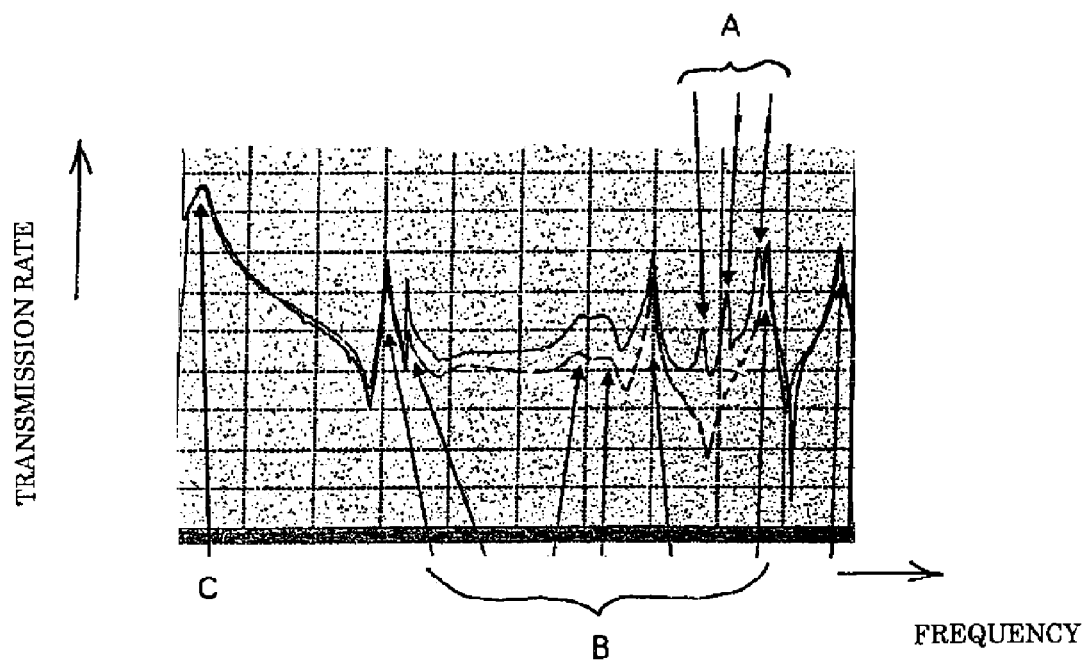
FIG. 19 is a graph showing a vibration transmission characteristic by the vibration isolation device in FIG. 17 and the vibration isolation device in FIG. 12.

Here, similarly to the case shown in FIG. 18, a dummy load of a weight M (=1080 kg) is supported by four vibration isolation devices 40 with the same spring constant K, and by measuring vibration transmission rates of the floor G and the dummy load, the case with the second viscoelastic body 47 and the case without the same are measured for comparison. Here, when the second viscoelastic body 47 exists, as shown by a dotted line in FIG. 19, of the resonance A of the machine mode by the mount 8 and the internal structure of the vibration isolation device 40, the resonance in the frequency of 150 to 170 Hz almost disappears, and it is known that the resonance A is drastically restrained by the second viscoelastic body 47. Also, with regard to the resonance B by the dummy load, a part of resonance peaks were lowered, and the vibration isolation effect by the second viscoelastic body 47 was confirmed.

In this case, supposing that Kc1=169.6 (kg/mm), Kc2=124.0 (kg/mm), Km1=88.0 (kg/mm), and Km2=344.8 (kg/mm), the spring constant K of the vibration isolation device 40 when the second viscoelastic body 47 exists is K=189.9 (kg/mm) from the above equation (1), while when the second viscoelastic body 47 does not exist, the spring constant Ko is Ko=159.6 (kg/mm). Also, the natural frequency fo (Hz) representing the basic performance of the vibration isolation device 40 supposing g is acceleration of gravity (=9.8 m/s2) can be acquired by:

$$fo = \frac{1}{2\pi} \times \sqrt{(K \times 1000 \times g/M)} \quad (\text{Hz}) \quad (2)$$

That is, from the equation (2), the natural frequency fo of the vibration isolation device 10 when the second viscoelastic body 47 exists, fo=6.5 (Hz), while the natural frequency fo of the vibration isolation device when the second viscoelastic body 47 does not exist, is fo=6.1 (Hz). Thus, it is known that the natural frequency fo is hardly changed by presence/absence of the second viscoelastic body 47 but substantially the same vibration isolation characteristic can be obtained.

In this way, according to the vibration isolation device 40 of this embodiment of the present invention, the vibration in the high frequency range can be restrained by providing the second viscoelastic body 47 with little change in the natural frequency, that is, without losing the vibration isolation effect. Therefore, the resonance by the machine mode of the internal structure of the vibration isolation device 40 can be effectively restrained.

Embodiment 5

Figure 16:
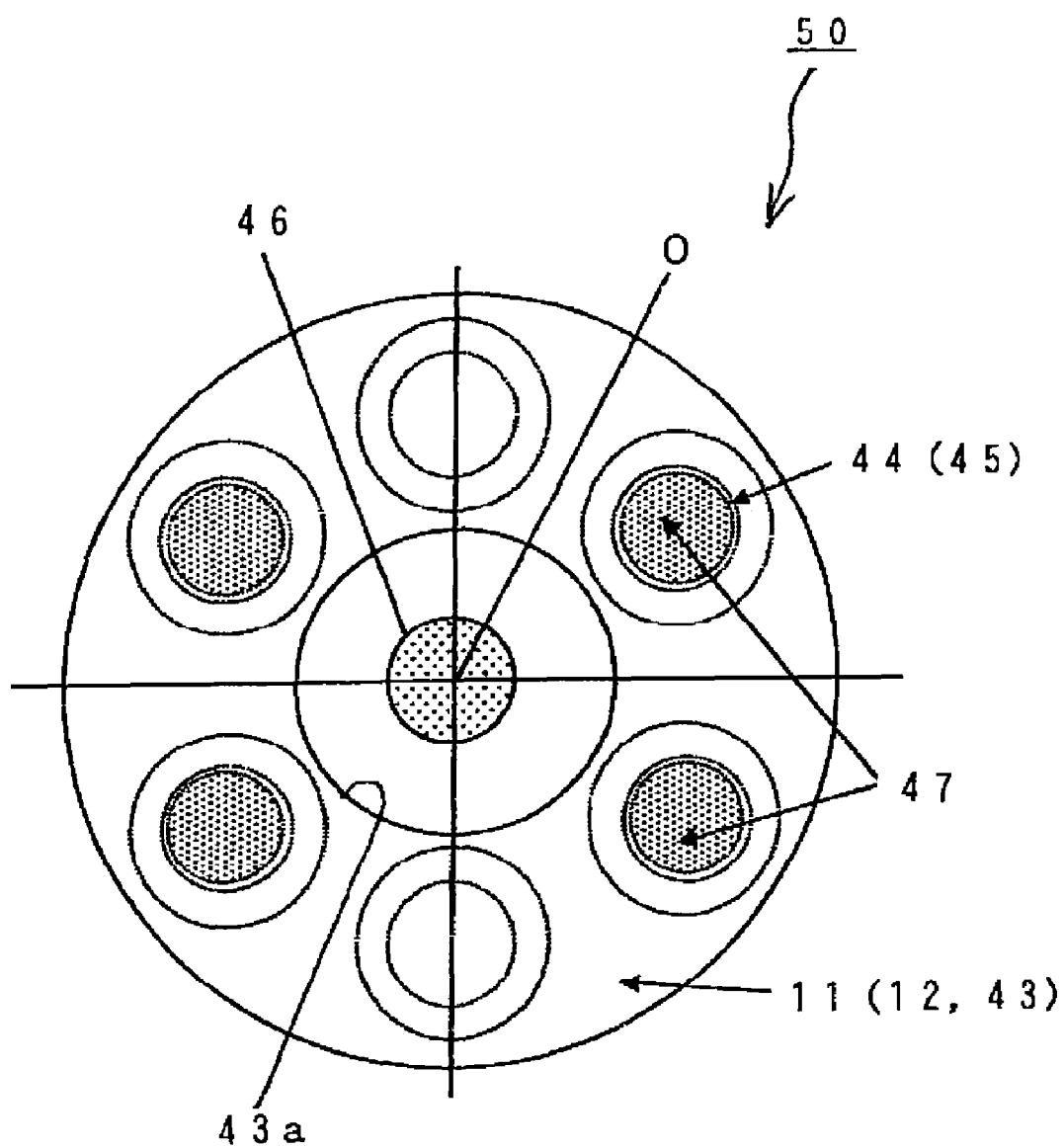
FIG. 16 is a schematic plan view showing arrangement of lower springs, upper springs and first and second viscoelastic bodies in a 5th embodiment of the vibration isolation device according to the present invention.
Figure 17:
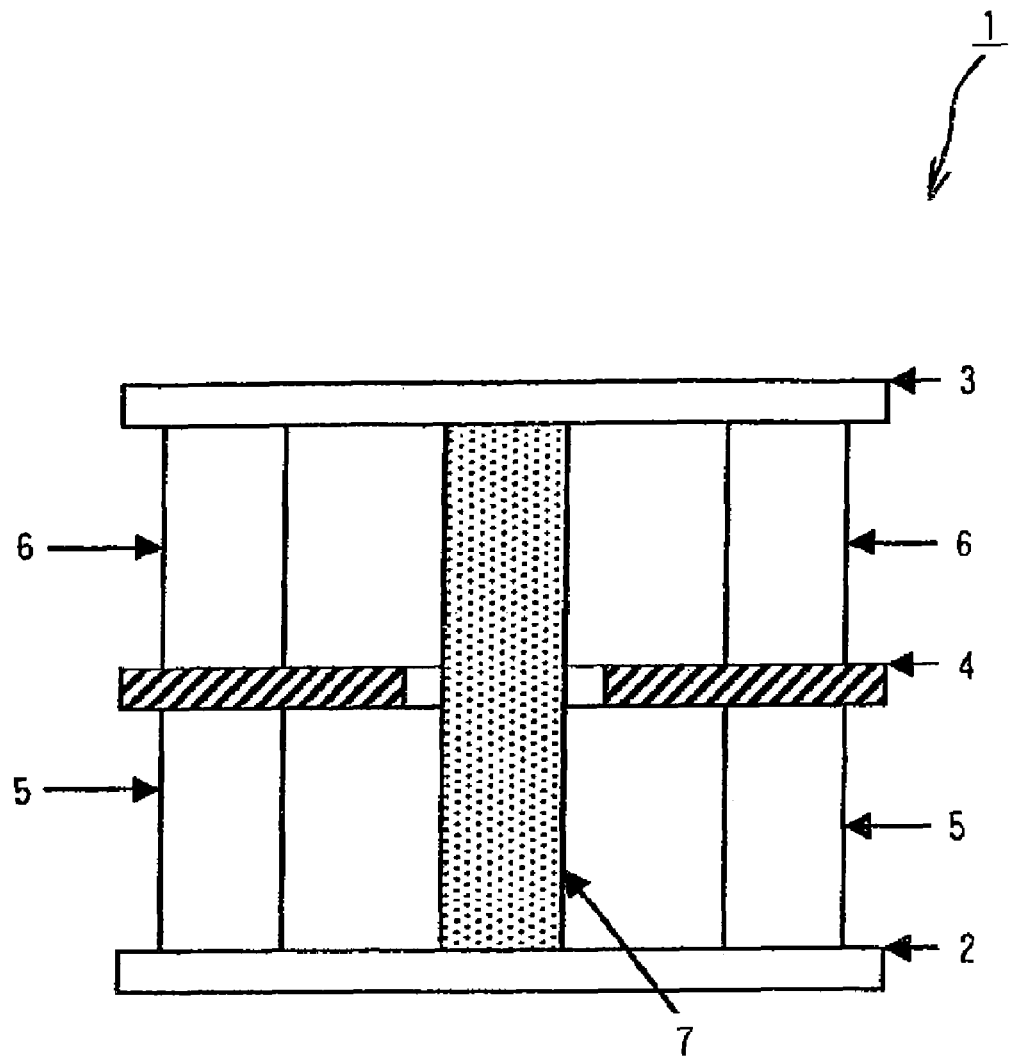
FIG. 17 is a schematic side view showing a construction of an example of a conventional vibration isolation device.

FIG. 16 shows a construction of a 5th embodiment of the vibration isolation device according to the present invention. In FIG. 16, since a vibration isolation device 50 has substantially the same construction as that of the vibration isolation device 40 shown in FIGS. 12 and 13, the same reference numerals are attached to the same components and the description thereof will be omitted. The above vibration isolation device 50 is different from the vibration isolation device 40 shown in FIGS. 12 and 13 only in arrangement of the lower springs 44, the upper springs 45 and the second viscoelastic body 47.

That is, in FIG. 16, the lower springs 44 and the upper springs 45 are arranged on the circumference of a predetermined radius with respect to the center line O passing perpendicularly the lower plate 11 and the upper plate 12 so as to extend in the vertical direction in parallel with the center line O at positions with an equiangular interval, respectively. Specifically, in the illustrated case, the lower springs 44 and the upper springs 45 are arranged at equiangular positions by 60 degrees with respect to the center line O, respectively.

Also, the second viscoelastic bodies 47 are arranged inside the other lower springs 44 except the two lower springs 44 shown along the vertical line in FIG. 16 out of six lower springs 44.

According to the so constructed vibration isolation device 50, it acts similarly to the vibration isolation device 40 shown in FIGS. 12 and 13, and the resonance by the machine mode caused by its internal structure can be effectively restrained without losing the vibration isolation effect.

In the above-mentioned vibration isolation device 50 by this embodiment of the present invention, the six lower springs 44, the upper springs 45 and the second viscoelastic bodies 47 are arranged as shown in FIG. 13 or 16, respectively, but not limited to this, these lower springs 44, the upper springs 45 and the second viscoelastic bodies 47 may be arranged in various ways only if they have an equiangular interval or in the point symmetry with respect to the first viscoelastic body 46 at the center.

In the above-mentioned embodiments, the case of vibration resistant of an electronic microscope as the equipment has been described, but it is obvious that, not limited to that, the invention may be applied to vibration resistant of other various equipment and devices, particularly precision equipment and so on.

As mentioned above, according to the present invention, an extremely excellent vibration isolation device can be provided by which vibration in the horizontal direction rather than the vertical direction is more effectively restrained.

What is claimed is:

1. A vibration isolation device comprising:
a lower plate fixedly arranged horizontally;
an upper plate arranged horizontally above this lower plate with a predetermined interval and supporting a supported object;
a viscoelastic body connecting the lower plate and upper plate to each other; and
compression coil springs arranged between the lower plate and upper plate in the vertical direction, wherein the coil springs are arranged at positions of a plurality of pairs with an equiangular interval in point symmetry around a center line, extending vertically from the lower plate toward the upper plate, and each comprised by a coil spring with a free length longer than an outer diameter, and the viscoelastic body is arranged axisymmetrically with respect to the center line of the upper plate and lower plate and inclined with respect to this center line, and wherein the viscoelastic body is arranged in a hollow cylinder portion extending in a longitudinal direction and having an upper end fixed to one of the lower plate and the upper plate, with the lower end arranged opposite to an inclined face of a receiving mount on the upper plate or the lower plate side and compressed/adjusted in the longitudinal axis direction by an adjusting screw capable of insertion to/removal from the hollow cylinder portion, and a receiving plate mounted to an end face of the lower end is pulled by a tension spring and housed into the hollow cylinder portion.

2. The vibration isolation device according to claim 1, wherein the receiving plate mounted at the lower end of the viscoelastic body is opposed to the inclined face of the opposing receiving mount when the supported object is loaded on the upper plate.

3. The vibration isolation device according to claim 2, wherein the receiving plate mounted at the lower end of the viscoelastic body is adjusted by the adjusting screw while the supported object is loaded on the upper plate and brought into contact with the inclined face of the opposing receiving mount.

4. The vibration isolation device according to claim 2, wherein the receiving plate mounted at the lower end of the viscoelastic body is separated from the inclined face of the opposing receiving mount in the state where the supported object is not loaded on the upper plate.

5. The vibration isolation device according to claim 2, wherein a plate is provided perpendicularly to the inclined face of the receiving mount at the upper part thereof opposing the receiving plate mounted on the end face of the lower end of the viscoelastic body.

6. The vibration isolation device according to claim 1, wherein the receiving plate mounted on the end face of the lower end of the viscoelastic body is pivotally supported by a hinge at the upper part with respect to the inclined face of the opposing receiving mount.

7. The vibration isolation device according to claim 6, wherein the receiving plate mounted at the lower end of the viscoelastic body is brought into contact with the inclined face of the opposing receiving mount when the supported object is loaded on the upper plate.

8. The vibration isolation device according to claim 6, wherein the receiving plate mounted at the lower end of the viscoelastic body is rotationally moved around the hinge in the state where the supported object is not loaded on the upper plate and the lower part is separated from the inclined face of the opposing receiving mount.

9. The vibration isolation device according to claim 8, wherein the hollow cylinder portion is provided with a notch portion to prevent contact of the viscoelastic body when the receiving plate is rotationally moved around the hinge and the lower part is floated.

10. The vibration isolation device according to claim 3, wherein the receiving plate mounted at the lower end of the viscoelastic body is separated from the inclined face of the opposing receiving mount in the state where the supposed object is not loaded on the upper plate.

11. The vibration isolation device according to claim 3, wherein a plate is provided perpendicularly to the inclined face of the receiving mount at the upper part thereof opposing the receiving plate mounted on the end face of the lower end of the viscoelastic body.

12. The vibration isolation device according to claim 7, wherein the receiving plate mounted at the lower end of the viscoelastic body is rotationally moved around the hinge in the state where the supported object is not loaded on the upper plate and the lower part is separated from the inclined face of the opposing receiving mount.

* * * * *